United States Patent
Palomar et al.

(10) Patent No.: US 8,706,041 B2
(45) Date of Patent: Apr. 22, 2014

(54) MULTIPLE-INPUT, MULTIPLE-OUTPUT COGNITIVE RADIO

(75) Inventors: Daniel Perez Palomar, Hong Kong (CN); Gesualdo Scutari, Francavilla sul Sinni (IT)

(73) Assignee: Dynamic Invention LLC, Mahe (SC)

( * ) Notice: Subject to any disclaimer, the term of this patent is extended or adjusted under 35 U.S.C. 154(b) by 376 days.

(21) Appl. No.: 13/174,555

(22) Filed: Jun. 30, 2011

(65) Prior Publication Data

US 2012/0071102 A1 Mar. 22, 2012

Related U.S. Application Data

(60) Provisional application No. 61/383,549, filed on Sep. 16, 2010.

(51) Int. Cl.
*H04B 1/00* (2006.01)

(52) U.S. Cl.
USPC ........ 455/63.1; 455/114.2; 455/3.06; 455/74; 463/40; 709/205

(58) Field of Classification Search
USPC .............. 455/63.1, 114.2, 3.06, 74, 522, 278, 455/296, 66.1; 463/40, 42; 709/205
See application file for complete search history.

(56) References Cited

U.S. PATENT DOCUMENTS

| | | | |
|---|---|---|---|
| 2007/0238499 A1* | 10/2007 | Wright | 463/1 |
| 2010/0113157 A1* | 5/2010 | Chin et al. | 463/42 |
| 2010/0210364 A1* | 8/2010 | York et al. | 463/43 |
| 2011/0014960 A1* | 1/2011 | Liang | 463/1 |
| 2012/0052953 A1* | 3/2012 | Annambhotla et al. | 463/40 |

OTHER PUBLICATIONS

Palomar, et al., "Alternative distributed algorithms for network utility maximization: Framework and applications," IEEE Trans. on Automatic Control, vol. 52, No. 12, pp. 2254-2269, Dec. 2007, 16 pages.

Scutari, et al., "Asynchronous iterative waterfilling for Gaussian frequency-selective interference channels," IEEE Trans. Inf. Theory, vol. 54, No. 7, pp. 2868-2878, Jul. 2008, 21 pages.

Goldsmith, et al., "Breaking spectrum gridlock with cognitive radios: An information theoretic perspective," Proceedings of the IEEE, vol. 97, No. 5, pp. 894-914, May 2009, 18 pages.

Haykin, et al., "Cognitive radio: Brain-empowered wireless communications," IEEE Jour. on Selected Areas in Communications, vol. 23, No. 2, pp. 201-220, Feb. 2005, 19 pages.

Devroye, et al., "Cognitive radio networks: Highlights of information theoretic limits, models, and design," IEEE Signal Processing Magazine, vol. 25, No. 6, pp. 12-23, Nov. 2008, 13 pages.

(Continued)

*Primary Examiner* — Minh D Dao

(74) *Attorney, Agent, or Firm* — Amin, Turocy & Watson, LLP

(57) ABSTRACT

A wireless communication system and constituent wireless communication devices are provided to implement a distributed, cognitive radio approach to spectrum sharing. Under the distributed approach, individual wireless communication devices self-enforce negotiated agreements on usage of an available spectrum without intervention from a centralized authority. Particularly, individual wireless communication devices are configured to enhance information rates of their respective transmissions under predetermined constraints. The predetermined constraints can include transmit power constraints (e.g., a maximum power available to the wireless communication devices), or interference constraints (e.g., constraints on the amount, direction, and/or quality of interference generated by transmissions).

25 Claims, 11 Drawing Sheets

(56) References Cited

OTHER PUBLICATIONS

Nokleby, et al., "Cooperative power scheduling for wireless mimo networks," in Proc. of the IEEE Global Telecommunications Conference (GLOBECOM), Washington, DC, USA, Nov. 26-30, 2007, pp. 2982-2986, 5 pages.

Wei Yu, "Dual methods for nonconvex spectrum optimization of multicarrier systems," IEEE Trans. on communications, vol. 54, No. 7, pp. 1310-1322, Jul. 2006, 13 pages.

Zhao, et al., "A survey of dynamic spectrum access," IEEE Communications Magazine, vol. 24, No. 3, pp. 79-89, May 2009, 26 pages.

Arslan, et al., "Equilibrium efficiency improvement in MIMO interference systems: A decentralized stream control approach," IEEE Trans. Wireless Communications, vol. 6 No. 8, pp. 2984-2993, Aug. 2007, 10 pages.

"Report of the spectrum efficiency working group," FCC Spectrum Policy Task Force, Nov. 2002. [Online]. Available: http://www.fcc.gov/sptf/files/SEWGFinalReport1.pdf, 37 pages.

Larsson, et al, "Game theory and the flat fading Gaussian interference channel," IEEE Signal Processing Magazine, (to appear) 2009, 20 pages.

Stevenson, et al. "IEEE 802.22: The first cognitive radio wireless regional area network standard," IEEE Communication Magazine, vol. 47, No. 1, pp. 130-138, Jan. 2009, 9 pages.

Luo, et al., "Analysis of iterative waterfilling algorithm for multiuser power control in digital subscriber lines". EURASIP J. Appl. Signal Process., pp. 1-15, May 2006, 11 pages.

Larsson, et al., "Competition versus collaboration on the MISO interference channel," IEEE Jour. on Selected Areas in Communications, vol. 26, No. 7, pp. 1059-1069, Sep. 2008, 8 pages.

Scutari, et al., "Competitive design of multiuser MIMO systems based on game theory: A unified view," IEEE Jour. on Selected Areas in Communications, vol. 26, No. 7, pp. 1089-1103, Sep. 2008, 14 pages.

Scutari, et al., "Optimal linear precoding strategies for wideband noncooperative systems based on game theory—part II: Algorithms," IEEE Trans. on Signal Processing, vol. 56, No. 3, pp. 1250-1267, Mar. 2008, 18 pages.

Akyildiz, et al., "A survey on wireless mesh networks", IEEE Commun. Mag., vol. 43, No. 9, pp. 23-30m, Sep. 2005, 8 pages.

Bertsekas, "Nonlinear Programming", 2nd ed. Athena Scientific Press, 1999, 37 pages.

Cendrillon, et al., "Autonomous spectrum balancing for digital subscriber lines," IEEE Trans. on Signal Processing, vol. 55, No. 8, pp. 4241-4257, Aug. 2007, 17 Pages.

Godsmith, et al., "Design challenges for energy-constrained ad hoc wireless networks," IEEE Wireless Commun. Mag., vol. 9, No. 4, pp. 8-27, Aug. 2002, 20 pages.

Magnus, et al., "Matrix Differential Calculus, with Applications in Statistics and Econometrics." New York: Wiley, 1999, 468 pages.

Quan, et al., "Collaborative wideband sensing for cognitive radios: An overview of challenges and solutions," IEEE Signal Processing Magazine, vol. 25, No. 6, pp. 60-73, Nov. 2008.

Rong, et al., "Optimal power schedule for distributed MIMO links," IEEE Trans. on Wireless Communications, vol. 7, No. 8, pp. 2896-2900, Aug. 2008.

Bertsekas, et al., Parallel and Distributed Computation: Numerical Methods, 2nd ed. Singapore: Athena Scientific Press 1989.

Brandwood, "A complex gradient operator and its application in adaptive array theory," Proc. Inst. Electr. Eng. F and H, vol. 130, No. 1, pp. 11-16, Feb. 1983.

Campbell, et al., "Generalized Inverse of Linear Transformations". New York: Dover, 1991. http://books.google.com/books?hl=en&lr=&id=legrYJFLUWQC&oi=fnd&pg=PA71&dq=CAMPBELL+Generalized+Inverse+of+Linear+Transformations&ots=480ZYSgYN9&sig=kHGEpGfglaLRqQTqSV88mJShW84#v=onepage&q=CAMPBELL%20Generalized%20Inverse%20of%20Linear%20Transformations&f=false.

Chung, et al., "A game-theoretic approach to power allocation in frequency-selective Gaussian interference channels," in Proc. 2003 IEEE Int. Symp. Information Theory (ISIT), Jun. 2003, p. 316.

Cottle, et al., The Linear Complementarity Problem. Cambridge Academic Press, 1992. http://books.google.com/books?hl=en&lr=&id=bGM80_pSzNIC&oi=fnd&pg=PR13&dq=COTTLE+The+Linear+Complementarity+Problem&ots=TnnpBcyl_i&sig=vCbdc97BoXxwixE3lJbxvEgaaiY#v=onepage&q&f=false.

Cover, et al., "Elements of Information Theory." John Wiley & Sons, 1991, New York.

Demirkol, et al., "Power-controlled capacity for interfering MIMO links," presented at the IEEE Vehicular Technology Conf. (VTC), Atlantic City, NJ, Oct. 7-10, 2001.

Devroye, et al., "Limits on communications in a cognitive radio channel," IEEE Communications Magazine, vol. 44, No. 6, pp. 44-49, Jun. 2006.

Etkin, et al., "Spectrum sharing for unlicensed bands," IEEE Journal on Selected Areas in Communications, vol. 25, No. 3, pp. 517-528, Apr. 2007.

Fudenberg, et al., "Game theory." MIT Press, Cambridge, 1991. http://books.google.com/books?id=pFPHKwXro3QC&pg=PA472&lpg=PA472&dq=FUDENBERG,+et+al.,+%22Game+theory&source=bl&ots=P07JrsxhLB&sig=jqLW2T95aUO21pzd5R8hWjwlwvU&hl=en#v=onepage&q=FUDENBER%2C%20et%20al.%2C%20%22Game%20theory&f=false.

Furi, et al., "On the mean value theorem, inequality, and inclusion," Amer. Math. Month., vol. 98, No. 9, pp. 840-846, Nov. 1991.

Galantai, "Projectors and Projection Methods". Kluwer Academic Publishers, 2003. http://books.google.com/books?hl=en&lr=&id=n1ZpS0aTtjwC&oi=fnd&pg=PR9&dq=GALANTAI+Projectors+and+Projection+Methods&ots=7GXNsmEvuc&sig=epRtNzytlb9KQ4MEamh2m_plfeU#v=onepage&q=GALANTAI%20Projectors%20and%20Projection%20Methods&f=false.

Harville, et al., "Matrix Algebra From a Statistician's Perspective". New York: Springer, 1997.

Hayashi, et al., "Spectrum management for interference—limited multiuser communication systems," IEEE Trans. on Information Theory, vol. 55, No. 3, pp. 1153-1175, Mar. 2009.

Hjorungnes, et al., "Complex-valued matrix differentiation: Techniques and key results," IEEE Trans. Signal Process., vol. 55, No. 6, pp. 2740-2746, Jun. 2007.

Horn, et al., "Matrix Analysis". Cambridge, U.K.: Cambridge Univ. Press, 1985. http://books.google.com/books?hl=en&lr=&id=PIYQN0ypTwEC&oi=fnd&pg=PR9&dq=HORN+Matrix+Analysis&ots=uAnQdBZZyP&sig=052n1yvZktMfAR0Y3gjhxu8gXJk#v=onepage&q&f=false.

Larsson, et al., Competition versus collaboration on the MISO interference channel,: IEEE J. Sel. Areas Commun., vol. 26, No. 7, pp. 1059-1069, Sep. 2008.

Leshem, et al., "Game theory and the frequency selective interference channel—a tutorial," IEEE Signal Processing Magazine, (to appear) 2009. [Online]. Available: http://arxiv.org/abs/0903.2174.

Liang, et al., "Power management in MIMO ad hoc networks: A game-theoretic approach," IEEE Trans. Wireless Commun., vol. 6, No. 4, pp. 2866-2882, Apr. 2007.

Luo, et al., "Dynamic Spectrum management: Complexity and duality," Jour. of Selected Topics in Signal Processing, vol. 2, No. 1, pp. 57-72, Feb. 2008.

McLeod, "Mean value theorems for vector valued functions," Edinburgh Math. Soc., ser. II, vol. 14, pp. 197-209, 1965.

Mitola, "Cognitive radio for flexible mobile multimedia communication," in IEEE International Workshop on Mobile Multimedia IEEE 1999 International Workshop on Mobile Multimedia Communications (MoMuC 1999), Sandiego, California, Usa, Nov. 15-17, 1999, pp. 3-10.

Osborne, et al., "A Course in Game Theory". Cambridge, MA; MIT Press, 1994.

Palomar, et al., "Practical algorithms for a family of waterfilling solutions," IEEE Trans. on Signal Processing, vol. 53, No. 2, pp. 686-695, Feb. 2005.

(56) References Cited

OTHER PUBLICATIONS

Pang, et al., "Distributed power allocation with rate constraints in Gaussian parallel interference channels," IEEE Trans. on Information Theory, vol. 54, No. 8, pp. 3471-3489, Aug. 2008.

Rosen, "Existence and uniqueness of equilibrium points for concave n-person games," Econometrica, vol. 33, No. 3, pp. 520-534, Jul. 1965.

Rudin, Principles of Mathematical Analysis, 3rd ed. McGraw-Hill Publishing Co. 1976.

Scutari, et al., "Competition and cooperation in wireless communication networks," Ph.D. dissertation, University of Rome, "La Sapienza", Rome, Italy, Nov. 2004.

Scutari, et al., "Optimal linear pre-coding strategies for wideband non-cooperative systems based on game theory—Part I: Nash equilibria," IEEE Trans. Signal Process., vol. 56, No. 3, pp. 1230-1249, Mar. 2008.

Scutari, et al., "Simultaneous iterative water-filling for Gaussian frequency-selective interference channels," in Proc. IEEE Int. Symp. Information Theory (ISIT), Seattle, WA, Jul. 9-14, 2006.

Scutari, et al., "Competitive optimization of cognitive radio mimo systems via game theory," in Convex Optimization in Signal Processing and Communications, D. P. Palomar and Y. C. Eldar, Eds. London: Cambridge University Press, 2009.

Scutari, et al., "The MIMO iterative waterfilling algorithm," IEEE Trans. on Signal Processing, vol. 57, No. 5, pp. 1917-1935, May 2009.

Shum, et al., "Convergence of Iterative waterfilling algorithm for Gaussian interference channels," IEEE J. Sel. Areas Commun., vol. 25, No. 6, pp. 1091-1100, Aug. 2007.

Zlobec, Stable Parametric Programming, Kluwer Academic Publishers, 2001, http://books.google.com/books?hl=en&lr=&id=sC_pKkPq8wAC&oi=fnd&pg=PR13&dq=ZLOBEC,+Stable+Parametric+Programming&ots=Zj8zEAR6Rl&sig=Frb1ES3ycgKUppbSPOzWS8pHCNY#v=onepage&q&f=false.

Wild, et al., "Detecting primary receivers for cognitive radio applications," in Proc. of the IEEE 2005 Symp. New Frontiers Dy-namic Spectrum Access Networks (DYSPAN 2005), Baltimore, Maryland, USA, pp. 124-130.

Ye, et al., "Optimized signaling for MIMO interference systems with feedback," IEEE Trans. on Signal Processing, vol. 51, No. 11, pp. 2839-2848, Nov. 2003.

Yu, et al., "Distributed multiuser power control for digital subscriber lines," IEEE Jour. on Selected Areas in Communications, vol. 20, No. 5, pp. 1105-1115, Jun. 2002.

Yucek, et al., "A survey of spectrum sensing algorithms for cognitive radio applications," IEEE Communication Surveys & Tutorials, vol. 11, No. 1, First Quarter 2009.

Zheng, "A new equivalent condition of the reverse order law for G-inverses of multiple matrix products," Electron. J. Linear Algebra, vol. 17, pp. 1-8, Jan. 2008.

\* cited by examiner

MULTIPLE-INPUT, MULTIPLE-OUTPUT COGNITIVE RADIO

CROSS-REFERENCE TO RELATED APPLICATIONS

This application claims priority to U.S. Provisional Application Ser. No. 61/383,549, filed on Sep. 16, 2010, entitled "ENHANCED MIMO SYSTEMS", the entirety of which is incorporated herein by reference.

TECHNICAL FIELD

The subject disclosure relates to a wireless device and a wireless communication system configured for opportunistic communications in a hierarchical cognitive network and, in particular, to wireless devices configured to implement a distributed, non-cooperative technique to achieve a system-wide equilibrium.

BACKGROUND

Increasing demand for wireless services has made radio spectrum a scarce resource. Even with this scarcity, some wireless networks, characterized by fixed spectrum assignment policies, are inefficient due, in part, to varying demand of licensed bandwidth in terms of time and/or space dimensions. Cognitive radio has emerged as a viable solution to inefficient spectrum utilization. Cognitive radio techniques endow wireless nodes with cognitive capabilities such as the ability to sense an electromagnetic environment, make short term predictions, and react by adapting transmission parameters (e.g., operating spectrum, modulation, transmission power, etc.) to improve utilization of available resources.

Typical cognitive radio applications to spectrum sharing involve a hierarchical access structure which distinguishes between primary users (e.g., users of licensed spectrum or legacy spectrum holders) and secondary users (e.g., users who access licensed spectrum dynamically without inducing intolerable Quality of Service (QoS) degradation on primary users). For instance, such scenarios involve concurrent communications of cognitive users (e.g., secondary users) competing over physical resources made available by primary users. From a signal processing perspective, secondary users transmit over multi-dimensional space, with coordinates representing time slots, frequency bins, and/or angles, with the objective of identifying a transmission strategy exploring available degrees of freedom while inducing no interference or limited interference on primary users.

One approach to implementing such opportunistic communications is to utilize global techniques. A central node can compute transmission strategies for wireless node with the objective of achieving a greater system-wide information rate. Such techniques often apply a theory of cooperative games (e.g., Nash bargaining optimality criterion); however, such techniques can often fail to control an amount of aggregate interference generated while also being computationally expensive. In addition, the central node, for best results, relies upon knowledge of channels and interference structures at every receiver, which can introduce scalability concerns and increased overhead (e.g., increased signaling among nodes).

The above-described deficiencies of conventional wireless networks and spectrum sharing techniques are merely intended to provide an overview of some of the problems of conventional systems and techniques, and are not intended to be exhaustive. Other problems with conventional systems and techniques, and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In various, non-limiting embodiments, a wireless communication system and constituent wireless communication devices are provided to implement a distributed, cognitive radio approach to spectrum sharing. Under the distributed approach, individual wireless communication devices self-enforce negotiated agreements on usage of an available spectrum without intervention from a centralized authority. Particularly, individual wireless communication devices are configured to enhance information rates of their respective transmissions under predetermined constraints. The predetermined constraints can include transmit power constraints (e.g., a maximum power available to the wireless communication devices), or interference constraints (e.g., constraints on the amount, direction, and/or quality of interference generated by transmissions).

Accordingly to a further embodiment, the wireless communication devices independently select a transmission strategy within the bounds of a strategic non-cooperative game, based upon game theory, which encodes the aforementioned constraints as aspects of the game. Within this framework, the wireless communications devices, while independently acting in their respective best interests, can converge to a system-wide equilibrium, where respective wireless communication devices maintain respective transmission strategies as deviations result in a decrease in the information rate.

These and other embodiments are described in more detail below.

BRIEF DESCRIPTION OF THE DRAWINGS

Various non-limiting embodiments are further described with reference to the accompanying drawings in which.

DETAILED DESCRIPTION

General Overview

Figure 1:
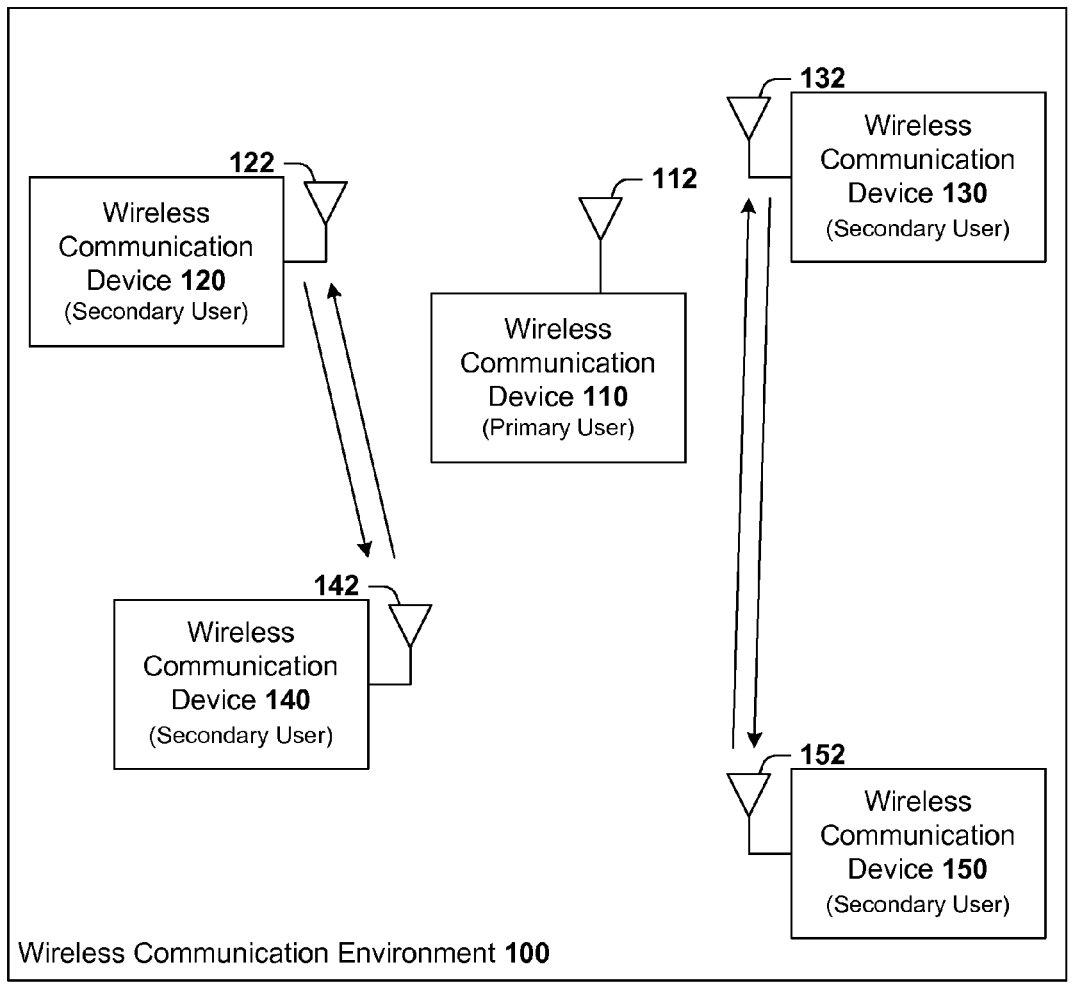
FIG. 1 illustrates a block diagram of an exemplary, non-limiting wireless communication environment suitable for incorporation of aspects of the disclosed subject matter.

Due to the inherently competitive nature of multi-user wireless communication systems, game theory concepts can be applied to address resource allocation scenarios in a distributed manner. Early applications focused on DSL systems in which users maximize respective information rates with respect to power allocation in a DSL system modeled as a frequency-selective Gaussian interference channel. This basic construct can be extended to ad-hoc frequency-selective and multiple-input, multiple-output (MIMO) networks. However, early applications of game theory to communications are not applicable to cognitive radio systems due to a lack of a mechanism to control an amount of interference generated by secondary users (e.g., users utilizing bandwidth and other resources assigned to primary or legacy users).

In various, non-limiting embodiments, decentralized mechanisms, based on non-cooperative game theory, are provided which are applicable to cognitive MIMO transceivers. In addition, a distributed design is provided of cognitive MIMO transceivers in a cognitive radio network composed of multiple primary and secondary users, wherein the secondary users operate to preserve a QoS of primary users. In particular, from an information theoretical perspective, resource allocation among secondary users can be modeled as a strategic non-cooperative game drawn from game theory concepts. Within the framework of the strategic non-cooperative game, where players (e.g., transmit/receive pairs of secondary users) compete against one another to maximize information rates over respective MIMO channels, further constraints, such as transmit power constraints and/or interference constraints, can be imposed. As described in greater detail below, interference constraints can be introduced as null and/or soft shaping constraints on transmit covariance matrices of secondary users. Null constraints, in an example, can be enforced to prevent secondary users from transmitting over prescribed subspaces identifying, for instance, portions of a spectrum, spatial angular directions, etc. Soft shaping constraints, in contrast, allow transmission of secondary users provided that such transmissions do not generate interference, in specific frequency bands and/or geographic locations, that exceeds temperature-interference limits.

The distributed technique described herein, which is employed by secondary users, enables the system to converge to an equilibrium, known as a Nash equilibrium in game theory, within which individual users are unwilling to unilaterally deviate from a selected transmission strategy as such change leads to a performance decrease. Under the distributed technique, individual cognitive MIMO transceivers (e.g., secondary users) independently, but in parallel, employ mechanisms to sense conditions within the wireless communication environment and, based on the sensed conditions, select a transmission strategy (e.g., a transmit covariance matrix) within the formulation of a non-cooperative game that encodes various constraints. The non-cooperative game, and set of valid strategies available to the secondary users, admits a system-wide equilibrium even though respective secondary users independently act without coordination and regardless of transmission strategies of primary users present in the wireless communication environment.

In one embodiment, a method is described herein that includes determining an interference level, at a transmitter, generated by a set of wireless nodes in a wireless communication environment, independently selecting a transmission strategy, based on the interference level, to achieve an information rate, wherein selecting the transmission strategy includes unilaterally identifying the transmission strategy from a set of available strategies of a game theoretical model of the wireless communication environment, and transmitting information, via the transmitter, to a receiver in accordance with the transmission strategy. In an example, the method can further include determining a set of constraints imposed on transmissions of the transmitter such that independently selecting the transmission strategy further includes determining the transmission strategy in accordance with the set of constraints. In yet another example, determining the set of constraints includes identifying a power constraint specifying a power amount available for allocation among directions in a domain space of a channel utilized by when transmitting the information, wherein the domain space is at least one of a time domain space, a frequency domain space, or a spatial domain space. Determining the set of constraints can further include determining a null constraint of the set of constraints, which can be accomplished by detecting locations of primary users within the wireless communication environment, determining, at least one of, respective directions of the primary users detected relative to the transmitter, respective frequency bands utilized by the primary users, or respective time slots utilized by the primary users, and generating the null constraint in accordance with the at least one of the respective directions, respective frequency bands, or respective time slots. In yet another example, determining the set of constraints can include determining a soft shaping constraint of the set of constraints, wherein the soft shaping constraint specifies at least one of total average power or peak average power allowed to be radiated along steering vectors indicating directions of primary users of the wireless communication environment.

According to a further aspect of this embodiment, the method can include generating a transmit covariance matrix and transmitting the information in accordance with the transmit covariance matrix. For instance, transmitting in accordance with the transmit covariance matrix can include transmitting signals along beamforming vectors and at power levels specified by the transmit covariance matrix. In generating the transmit covariance matrix, the method can include performing a waterfilling operation over a channel that includes the interference level and encodes a set of constraints on transmissions of the transmitter. In an additional example, the method includes utilizing a result of the waterfilling operation as the transmit covariance matrix, wherein the result satisfies the set of constraints.

In yet another aspect, the method includes receiving an update schedule specifying a set of iterations at which the transmitter updates the transmission strategy, iterating through a series of iterations, and updating the transmission strategy when a current iteration is included in the set of iterations. Moreover, in an example, the method can include verifying whether a convergence criterion is satisfied and terminating the iterating when the convergence criterion is satisfied, wherein satisfaction of the convergence criterion indicates a system-wide equilibrium in the wireless communication environment. For a respective iteration, the method can include measuring interference generated by a wireless node of the set of wireless nodes, calculating the interference level based the interference measured and previous interference measurements made in a previous iteration, and identifying the transmission strategy for the respective iteration. According to an example, identifying the transmission strategy for the respective iteration can include maintaining a previous transmission strategy as the transmission strategy when the respective iteration is not included in the set of iterations at which the transmitter updates and determining a new transmission strategy for utilization as the transmission strategy when the respective iteration is included in the set of iterations at which the transmitter updates. In a further example, determining the new transmission strategy includes calculating a best-response which maximizes the information rate of the transmitter in view of the interference level.

In another embodiment, a wireless communication apparatus is described herein that includes a receiver subsystem, coupled to a set of receive antennas, and configured to process a received signal, transmitted over a first wireless channel, to generate a received information signal, a transmitter subsystem, coupled to a set of transmit antennas, and configured to process output information and to generate a signal, from the output information, transmittable over a second wireless channel via the set of transmit antennas, a non-transitory, computer-readable storage medium, having stored thereon, an adaptive transmission module configured to evaluate conditions within a wireless communication environment of the wireless communication apparatus, to identify a set of constraints imposed on transmission of the wireless communication apparatus, and to generate a transmission strategy applicable to the transmissions of the wireless communication apparatus, wherein the transmission strategy represents a response in a strategic, noncooperative game formulation of opportunistic transmission within the wireless communication environment, and a processor, coupled to the non-transitory, computer-readable storage medium, and configured to execute the computer-executable modules stored thereon.

According to an example, the transmitter subsystem is further configured to apply the transmission strategy generated by the adaptive transmission module to generate the signal from the output information. Moreover, in another example, the adaptive transmission module can include an environment sensing module configured to determine an interference level observed by the wireless communication apparatus and to estimate channels over which signals are received or transmitted by the wireless communication apparatus, a node detection module configured to detect presence of primary wireless nodes within the wireless communication environment, a constraint determination module configured to generate the set of constraints based on the interference level and the presence of the primary wireless nodes, and a matrix generation module configured to generate a transmit covariance matrix that specifies the transmission strategy. The adaptive transmission module can further include a cognitive radio engine configured to direct the environment sensing module, the node detection module, the constraint determination module, and the matrix generation module in accordance with a distributed response algorithm for the strategic, noncooperative game formulation, wherein the cognitive radio engine is further configured to iterate through a plurality of iterations until a convergence criterion is satisfied, wherein, in a respective iteration, the cognitive ration engine is configured to instruct the environment sensing module to update environment information and to instruct the matrix generation module to generate a transmit covariance matrix. In an example, satisfaction of the convergence criterion indicates that the wireless communication environment converged to a Nash equilibrium of the strategic, noncooperative game formulation.

According to further examples, the constraint determination module is further configured to determine a null constraint based on the detected presence of the primary wireless nodes, wherein the null constraint specifies frequency, temporal, or spatial regions over which the wireless communication apparatus cannot transmit. The node detection module is further configured to determine respective locations of the primary wireless nodes in terms of, at least one of, space, frequency, or time. The matrix generation module is further configured to employ a waterfilling operation over a channel matrix modified in accordance with the interference level, the channel estimates, and the set of constraints.

In yet another embodiment, described herein is a computer-readable storage medium having stored thereon computer-executable instructions that, in response to execution, cause a communication device to perform operations. The operations can include evaluating environmental conditions within a wireless communication system to identify interference generated by a plurality of secondary users sharing identical resources with at least one primary user of the wireless communication system, determining a set of constraints that represent physical constraints of the communication device and interference limits which can be imposed on the at least one primary user, determining a transmission strategy as a response to a noncooperative game formulation of resource competition among the plurality of secondary users in the wireless communication system, wherein the transmission strategy represents an independent action of the communication device without coordination with the plurality of secondary users, and employing the transmission strategy for data transmissions within the wireless communication system.

Herein, an overview of some of the embodiments of a game theory formulation of opportunistic communications by secondary users in a wireless communication environment has been presented above. As a roadmap for what follows next, an overview of exemplary, non-limiting embodiments and features of an wireless communication device employing opportunistic communications are described in more detail. Then, detailed mathematical models of wireless communications and the game theory formulation are provided. Finally, representative network and computing environments are described in which such embodiments and/or features described herein can be implemented.

Game Theoretical Approach to Distributed Resource Allocation

As mentioned above, a cognitive MIMO transceiver is a wireless communication device capable of monitoring conditions in wireless communication environment and, in view of sensed conditions, adaptively control transmissions and/or reception of transmissions to increase data rates, reduce generated interference, or to reduce effects of interference generated from other users. In addition, these features of cognitive MIMO transceivers enable secondary users (e.g., unlicensed users) to opportunistically access idle spectrum originally assigned to primary users (e.g., licensed users), without burdening the primary users with unacceptable levels of interference. A large portion of the radio frequency spectrum is inefficiently utilized. For instance, cellular network frequency bands tend to be heavily loaded in many parts of the world, while other frequency bands, such as military frequencies, amateur radio frequencies, paging frequencies, etc., are typically underutilized. Moreover, spectrum utilization, in general, varies from time-to-time and from place-to-place and conventional fixed spectrum allocation often inhibits rarely utilized frequencies (e.g., frequencies assigned to specific services) from being employed by secondary users.

According to one or more non-limiting examples, cognitive MIMO transceivers (also referred to herein as cognitive radios) can perform various operations such as spectrum sensing, spectrum management, spectrum mobility, and/or spectrum sharing. With spectrum sensing, cognitive radios can detect unused spectrum by detecting primary transmitters, performing cooperative detection, or utilizing interference-based detection. Under spectrum management, cognitive radios perform spectrum analysis and spectrum decision to identify an available spectrum that meets communication requirements of a user without inducing undue interference on primary users. Spectrum mobility and spectrum sharing related to functions of cognitive radios to transition among different spectra and to share the spectra with other users.

With respect to one or more non-limiting aspects of a cognitive radio system as described above, FIG. 1 shows a block diagram of an exemplary embodiment of an environment under which aspects of the disclosed subject matter can be deployed. As shown in FIG. 1, a wireless communication environment 100 can include a plurality of wireless communication devices 110-150, which can respectively utilize a portion of a frequency band to communicate with each other or with other devices (not shown). The portion of the frequency band, as used herein, can refer to frequency band resources and/or divisions thereof, such as channels, resource blocks, symbols (e.g., orthogonal frequency division multiplexing (OFDM) symbols, etc.), tones, taps, sub-carriers, etc. The over-the-air interface utilized by wireless devices 110-150 can be based on one of a variety of protocols or technologies (e.g., CDMA, OFDMA, TDMA, FDMA, LTE, LTE-A, CDMA2000, etc.), which define a series of physical channels (e.g., collections of frequency portions over collections of time periods). Such channel definitions and other protocol aspects can be defined in various communication specifications on which the wireless communication devices 110-150 are based. As shown in FIG. 1, wireless communication devices 110-150 can respectively include antenna arrays 112, 122, 132, 142, and 152, which can respectively include a plurality of receive antennas and a plurality of transmit antennas. Moreover, the plurality of receive antennas and the plurality of transmit antennas need not be mutually exclusive as individual antennas can be employed for both transmission and reception. Thus, according to an aspect, wireless communication devices 110-150 can be MIMO devices.

The portion of the frequency band or spectrum utilized within wireless communication environment 100 can be reserved for particular users, referred to as primary users. In one example, the spectrum utilized with wireless communication environment 100 can be reserved by a regulatory agency (such as the Federal Communications Commission (FCC), etc.) or a standards organization (e.g., a de facto reservation created through compliance with a communication standard). As shown in FIG. 1, wireless communication device 110 can be a primary user for which the spectrum of wireless communication environment 100 is specifically reserved. Wireless communication device 110 can be, for example, a base station providing wireless communication services to other primary users (not shown) such as mobile devices (e.g., mobile phones, handsets, etc.) or other user equipment (e.g., general computing devices with wireless capabilities). In another example, wireless communication device 110 can be a user equipment device which communicates with a base station (not shown) to obtain wireless services. In short, wireless communication device 110 is generally understood to be some kind of wireless interface device (e.g., a wireless transmitter, a wireless receiver, or a wireless transceiver) which is licensed for a particular frequency spectrum employed in wireless communication environment 100, or accesses a service allocated to the particular frequency spectrum.

As further shown in FIG. 1, wireless communication environment 100 can include one or more secondary users, such as wireless communication devices 120-150, which are typically not licensed on the particular frequency spectrum and/or access different services than the service for which the particular frequency spectrum is allocated. To illustrate, a cellular phone can be a secondary user in an environment associated with a frequency spectrum primarily allocated for broadcast television, as the cellular phone utilizes a different service (e.g., cellular wireless communications) than the service (e.g., reception of broadcast television) for which the frequency spectrum is primarily allocated. In another example, a WiFi device (e.g., an 802.11 device) can be a secondary user in an environment or on a frequency spectrum licensed for cellular communications, as the WiFi device is not licensed to utilize the frequency spectrum allocated for cellular communications.

To facilitate efficient utilization of the particular frequency spectrum allocated in wireless communication network 100 and licensed for utilization by primary users such as wireless communication device 110, secondary users (e.g., wireless communication devices 120-150) can utilize cognitive radio techniques to sense conditions within wireless communication environment 100 and utilize resources included in the particular frequency spectrum without causing undue interference to primary users (e.g., wireless communications device 110). In accordance with this perspective, wireless communication environment 100 can be considered a multi-user environment including primary users and secondary users sharing the same physical resources (e.g., time, frequency, and/or space). Wireless communication environment 100 can support a variety of wireless links such as, but not limited to, MIMO peer-to-peer links (e.g., as shown in FIG. 1 between devices 120 and 140 and devices 130 and 150, respectively), multiple access channels, and/or broadcast channels (e.g., single antenna, multi-antenna, flat, frequency-selective, etc.). Wireless communication devices 110-150, in an embodiment, do not cooperate with one another and, moreover, wireless communication environment 100 does not include a central authority which handles network access for secondary users (e.g., wireless communication devices 120-150).

Without a central authority, network access by secondary users is handled in a distributed manner such that wireless communication devices 120-150 individually determine when to transmit and parameters of such transmissions. Within this framework of opportunistic communications, which enables wireless communication devices 120-150 (e.g., secondary users) to transmit with overlapping spectrum and/or coverage with wireless communication device 110 (e.g., a primary user), interference constraints can be imposed on wireless communication devices 120-150 to maintain usability of wireless communication environment 100. The interference constraints can dictate that degradation induced on performance of primary users is null and/or tolerable. Such interference constraints can take the form of null constraints or soft shaping constraints (also referred to herein as soft constraints).

Figure 2:
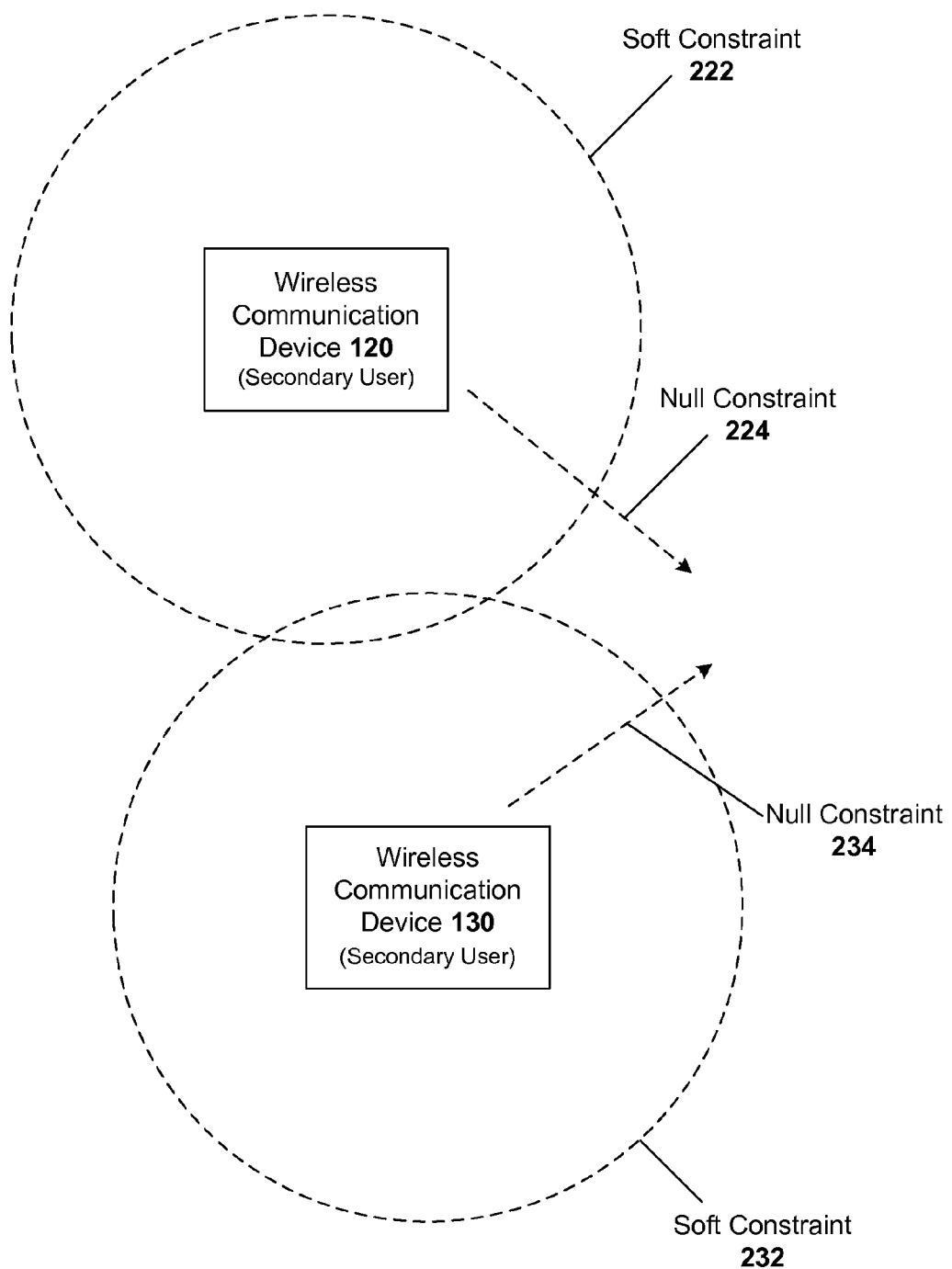
FIG. 2 is a block diagram of an exemplary, non-limiting wireless communication environment in which a set of independent wireless devices compete for resources in view of imposed constraints.

Turning to FIG. 2, illustrated are depictions of null and soft constraints. FIG. 2 illustrates only wireless communication device 120 and wireless communication device 130 for convenience. However, it is to be appreciated that similar constraints can be imposed on wireless communication devices 140 and 150 and/or any other secondary users included in the wireless communication environment. As shown in FIG. 2, wireless communication device 120 can have an associated soft constraint 222 and an associated null constraint 224. Similarly, wireless communication device 130 can have, associated therewith, a soft constraint 232 and a null constraint 234.

As indicated in FIG. 2, null constraints, such as null constraints 224 and 234, represent spatial and/or frequency directions along with wireless communication device 120 and 130, respectively, should not transmit. Soft constraints (e.g., soft constraints 222 and 232), in an aspect, represent a relaxed version of null constraints. Particularly, soft constraints 222 and 232 indicate frequency bands and/or geographic regions within which wireless communications device 120 and 130, respectively, should maintain generated interference under a predetermined threshold. While FIG. 2 depicts soft constraints 222 and 232 as circular regions concentrically located (approximately) around wireless communication devices 120 and 130, respectively, it is to be appreciated that such depiction is intended as a visual aid to assist in comprehension in one or more features of soft constraints as disclosed herein. Soft constraints 222 and 232 can indicate a variety of complex geometric shapes in space overlapping with wireless communication devices 120 and 130, respectively or located remote from wireless communication devices 120 and 130. Further, soft constraints 222 and 232 can indicate specific frequencies or frequency bands. A detailed description of soft constraints and null constraints is provided below.

According to an example, null constraints 224 and 234 and soft constraints 222 and 232 can be signaled to wireless communication devices 120 and 130, respectively. For instance, a primary user, such as a base station or access point, can broadcast parameters specifying features of the null and/or soft constraints. Such broadcasts can be received by secondary users (e.g., wireless communication devices 120 and 130). The broadcasts can include complete specifications of the constraints or basic parameters of the constraints from which the wireless communications devices 120 and 130 utilize to respectively determine null constraints 224 and 234 and soft constraints 222 and 232.

In another example, wireless communication devices 120 and 130 can independently determine the null and/or soft constraints utilizing cognitive radio techniques. For instance, wireless communication devices 120 and 130 can detect locations of primary users, transmissions by primary users, resources utilized by primary users, etc., and construct null and/or soft constraints accordingly. Based on sensed characteristics of primary users and predetermined interference thresholds, wireless communication devices 120 and 130 determine the constraints with which transmissions can be adapted to avoid undue interference on primary users.

Referring back to FIG. 1, in an embodiment, the secondary users, e.g., wireless communication devices 120-150 implement opportunistic transmissions within wireless communication environment 100 in accordance with a framework based on a strategic non-cooperative game, in which wireless communication devices 120-150 individually attempt to maximize or substantially enhance information rates of transmissions over respective MIMO channels subject to power constraints and the aforementioned interference constraints. As described in greater detail below, wireless communication devices 120-150 utilize a waterfilling approach to determine a transmit covariance matrix (e.g., a transmission strategy) to employ for opportunistic transmissions. The channel, over which waterfilling occurs, is modified to consider the power and/or interference constraints. As will also be described in greater detail below, wireless communication devices 120-150, while implementing independent decisions, can converge to a system-wide equilibrium, whereby wireless communication devices 120-150 do not unilaterally alter respective transmit covariance matrices (e.g., transmit strategies) without an external stimulus.

Figure 3:
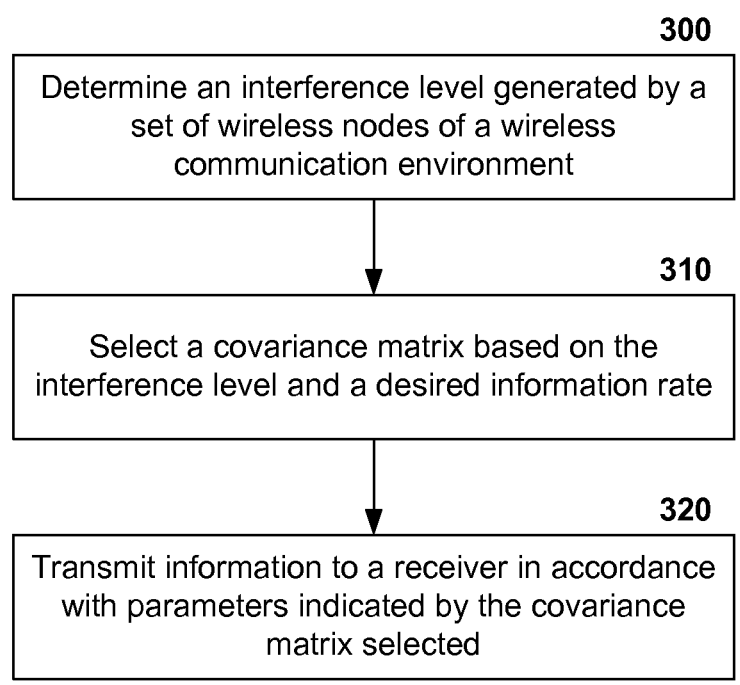
FIG. 3 is a flow diagram illustrating an exemplary, non-limiting embodiment for selecting a transmission strategy, independently, based on sensed environmental conditions.

FIG. 3 depicts a flow diagram illustrating an exemplary, non-limiting embodiment for selecting a transmission strategy, independently, based on sensed environmental conditions. The embodiment shown in FIG. 3 can be utilized, for example, by wireless communication devices 120, 130, 140, and/or 150 of FIG. 1 to enhance information rates for opportunistic transmissions in a wireless communication environment. At 300, an interference level is determined, wherein the interference level includes interference generated by transmissions by a set of wireless nodes in a wireless communication environment. The set of wireless nodes can include one or more primary users and/or one or more secondary users.

At 310, a covariance matrix is selected based on the interference level and a desired information rate. According to a non-limiting example, the covariance matrix is selected to achieve the desired information rate for a transmission in view of the interference level present in the wireless communication environment. At 320, information is transmitted to a receiver (e.g., a wireless node in the set of wireless nodes) in the wireless communication environment. The transmission is configured in accordance with parameters indicated by the selected covariance matrix. For instance, with MIMO transceivers such as wireless communication devices 120-150 of FIG. 1, eigenvectors of the covariance matrix can specify beamforming parameters (e.g., transmit direction, beamforming weight vectors, etc.) and eigenvalues of the covariance matrix can specify power allocation amounts in each transmit direction.

Figure 4:
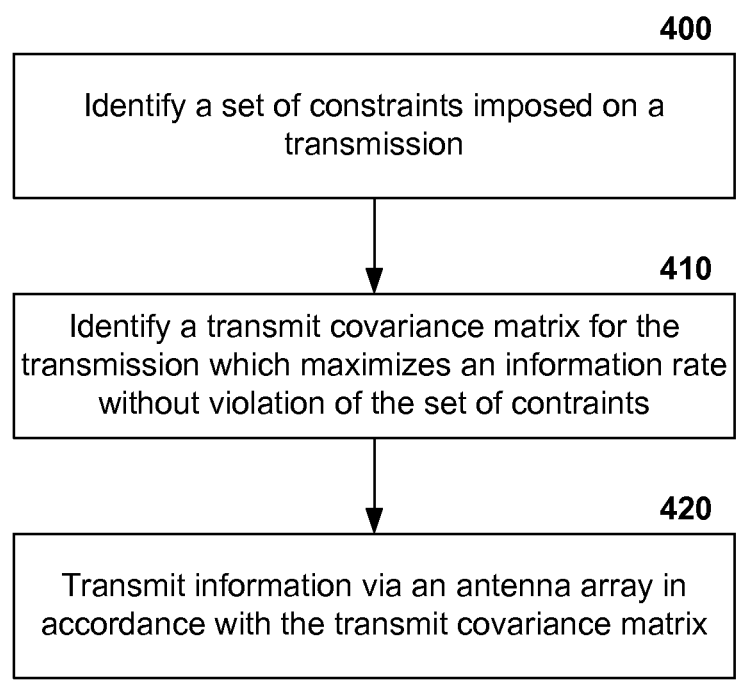
FIG. 4 is a flow diagram illustrating an exemplary, non-limiting embodiment for identifying a transmission strategy in view of a set of imposed constraints.

FIG. 4 illustrates a flow diagram of an exemplary, non-limiting embodiment for identifying a transmission strategy in view of a set of imposed constraints. In one example, the embodiment of FIG. 4 can be utilized in connection with the embodiment of FIG. 3. In another example, however, the embodiment of FIG. 4 can be independently employed by wireless devices such as wireless communication devices 120-150 of FIG. 1. At 400, a set of constraints, imposed on opportunistic transmissions by secondary users, is identified. The set of constraints can include a power constraint such as, for example, a maximum transmit power available to a wireless device across transmit antennas. The power constraint can be imposed due to physical characteristics (e.g., battery power, voltage of transmitter, etc.) of the wireless device or predetermined or imposed by, for example, a network service provider, a spectrum management agency, standards specifications, or the like. The set of constraints, in a further example, can include interference constraints such as the null constraints and soft shaping constraints described above.

At 410, a transmit covariance matrix is identified based on the set of constraints. For instance, the transmit covariance matrix identified configures a transmission without violation of respective constraints in the set of constraints. In a further example, the transmit covariance matrix identified operates to maximize an information rate of the transmission while respecting the set of constraints imposed. At 420, information is transmitted via an antenna array in accordance with the transmit covariance matrix.

Figure 5:
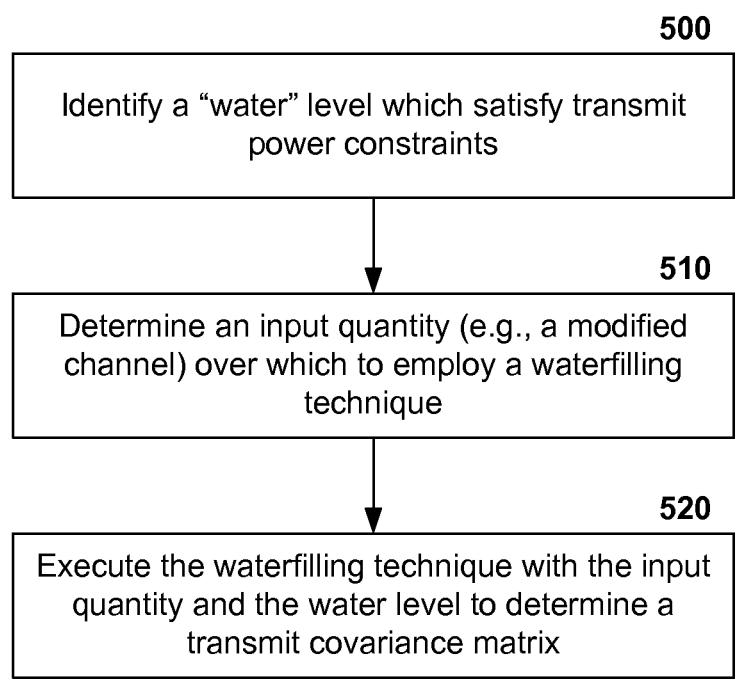
FIG. 5 is a flow diagram illustrating an exemplary, non-limiting embodiment for determining a transmit covariance matrix.

FIG. 5 depicts a flow diagram illustrating an exemplary, non-limiting embodiment for determining a transmit covariance matrix. The embodiment of FIG. 5 can be employed, for example, to generate a covariance matrix for a transmission and, moreover, can be utilize in connection with the embodiment of FIG. 3 and/or the embodiment of FIG. 4 to select or identify a transmit covariance matrix based on an interference level sensed in the environment (e.g., step 310 of FIG. 3) and/or a set of constraints imposed on transmissions from secondary users within the environment (e.g., step 410 of FIG. 4).

At 500, a water level is identified, where the water level is a power level amount which satisfies transmit power constraints on a wireless device. The water level, in an aspect, facilitates identifying spatial and/or frequency channels (or eigenmodes of an input matrix) to which power is allocated. For instance, power allocation, according to an intuitive example, is driven to spatial and/or frequency channels having more favorable signal-to-noise ratio (SNR) conditions. At 510, an input quantity, e.g., a modified channel or input matrix, is determined over which a waterfilling technique is employed in connection with the water level. The input quantity can be a matrix representing an interference channel and can be modified to incorporate constraints such as null and soft shaping constraints described above. Details regarding the input quantity and modification thereto are provided below. At 520, the waterfilling technique is executed over the input quantity and in accordance with the water level. According to a non-limiting example, a result of the execution of the waterfilling technique is a transmit covariance matrix. The transmit covariance matrix can be employed for transmission with the environment without violation of imposed constraints, while also substantially maximizing an achievable information rate.

Figure 6:
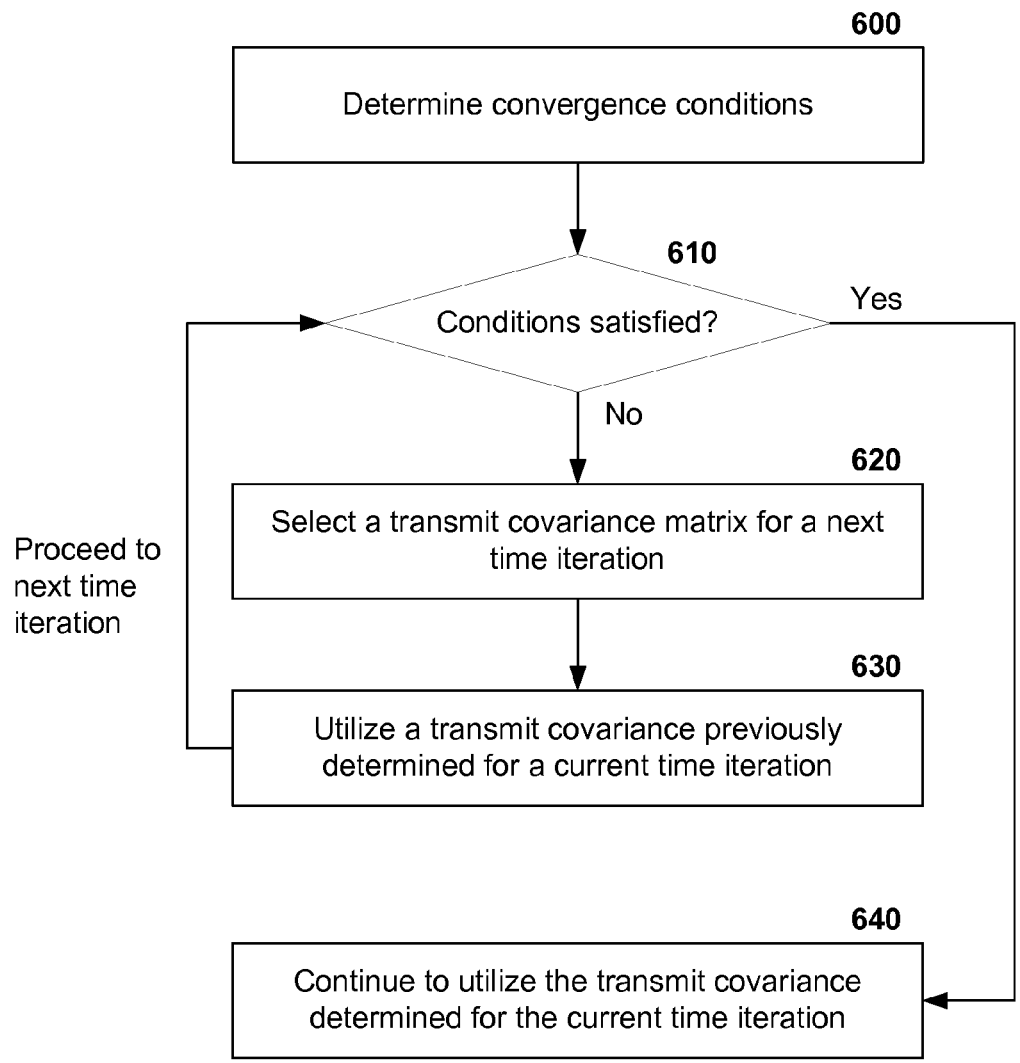
FIG. 6 is a flow diagram illustrating an exemplary, non-limiting embodiment for determining transmission strategies in a distributed fashion until a system-wide equilibrium is achieved.

FIG. 6 illustrates an exemplary, non-limiting embodiment for determining transmission strategies in a distributed fashion until a system-wide equilibrium is achieved. As described above, secondary users (e.g., unlicensed users) can compete within a strategic non-cooperative game formulation for transmission resources subject to power and/or interference constraints. Within the game, secondary users respectively select transmission strategies (e.g., transmit covariance matrices) which enhance respective transmission rates of the secondary users. Transmission strategy selection, according to an aspect, occurs is a distributed manner such that respective transmission strategy selections occur independently from other selections by other users. As will be described in accordance with the embodiment of FIG. 6, the secondary users can adjust transmission strategies periodically over a plurality of time iterations, where respective iterations can span an arbitrary amount of time, which is coupled to the wireless communication environment (e.g., a transmission time interval, sub-frame duration, frame duration, etc.) or separate from time characteristics of the environment (e.g., every 15 ms, etc.). During a time iteration, the secondary users can select respective transmission strategies to be utilized in a subsequent time iteration. In addition, the secondary users, in the time iteration, can verify whether or not prescribed convergence conditions are satisfied, which can signal that the secondary users have converged to a system-wide equilibrium (e.g, a Nash equilibrium of the strategic non-cooperative game).

At 600, convergence conditions are determined. Convergence conditions, in one aspect, can specify a structure of an equilibrium (e.g., a structure of a transmit covariance matrix which enables the equilibrium). In another aspect, the convergence conditions can be threshold parameter that empirically indicates convergence to an equilibrium. For example, a history of transmit covariance matrices, selected in respective time iterations, can be recorded. If identical or substantially identical transmit covariance matrices are maintained for a predetermined number of iterations, an equilibrium can be declared.

In a further example, the convergence conditions can be preconfigured by a wireless device manufacturer, a network operator, a standards organizations, etc. However, to further enhance a decentralized nature of embodiments disclosed herein, the convergence conditions can be independently derived by secondary users based on sensed characteristics of a wireless communication environment.

At 610, a determination is made as to whether the conditions are satisfied. For example, a currently selected transmit covariance matrix can be compared against a structure of an equilibrium, wherein a match indicates the conditions are satisfied. In another example, the currently selected transmit covariance matrix can be compared a history of previously selected transmit covariance matrices from previous iterations. When the comparison with the history indicates a repetition beyond a predetermined threshold, the conditions can be deemed satisfied. If, at 610, it is determined that the conditions are satisfied, then, as shown at 640 of FIG. 6, the transmit covariance matrix for a current time iteration continues to be utilized until an external stimulus or other factors (e.g., mobility of users, changing constraints, etc.) disrupt the equilibrium.

If, at 610, it is determined that the convergence conditions are not satisfied, then, at 620, a transmit covariance matrix is selected for a next time iteration. According to one or more aspects, the transmit covariance matrix can be selected in accordance with the embodiments described above in connection with FIGS. 3, 4, and/or 5. At 630, a transmit covariance, previously determined in a prior iteration, is utilized for the current time iteration for data transmissions. As shown in FIG. 6, a wireless device implementing the embodiment depicted can proceed to a next time iteration and loop back to 610 where the convergence conditions are checked.

Figure 7:
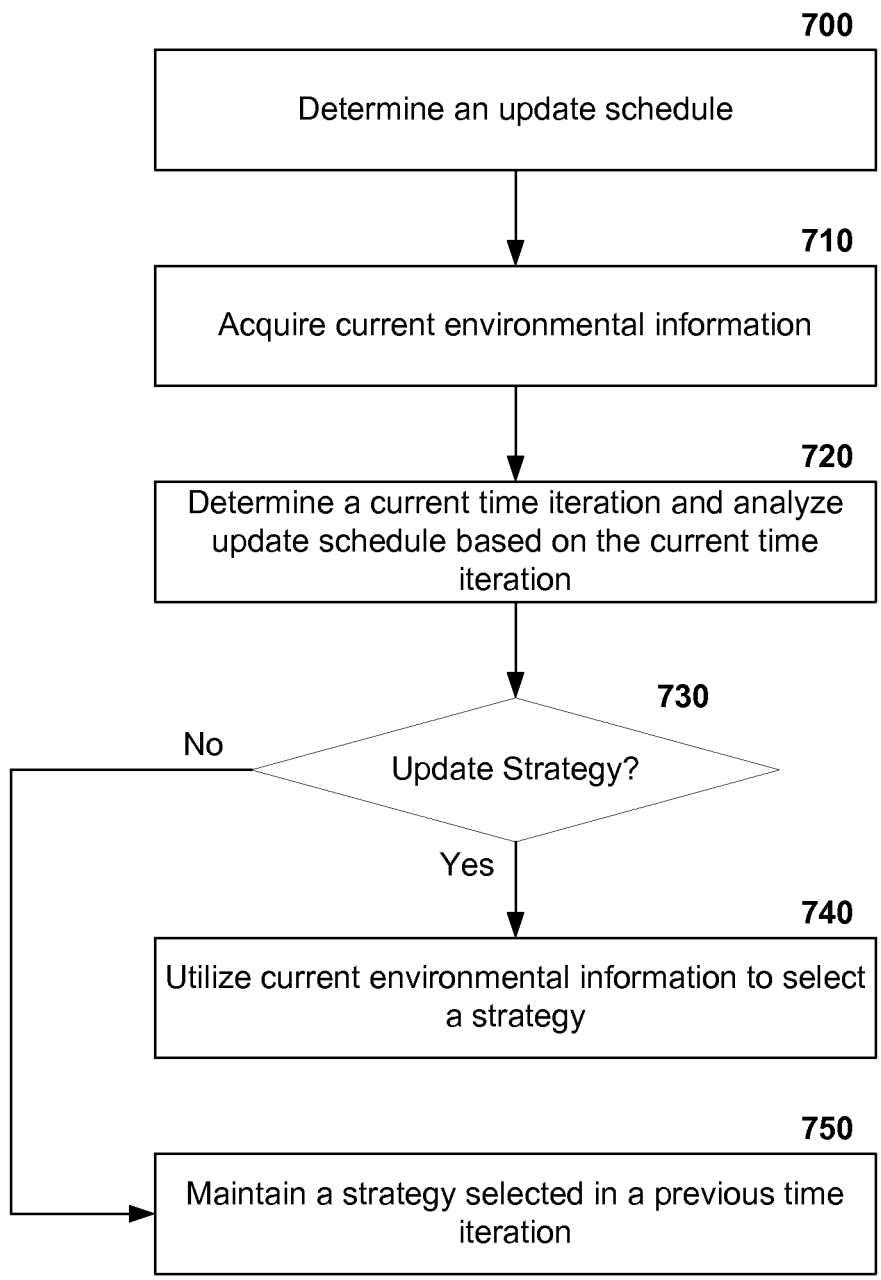
FIG. 7 is a flow diagram illustrating an exemplary, non-limiting embodiment for updating transmission strategies.

FIG. 7 illustrates an exemplary, non-limiting embodiment for updating transmission strategies. Extending the embodiment of FIG. 6, this embodiment describes a scenario in which secondary users update strategies during a subset of time iterations. At 700, an update schedule is determined The update schedule specifies time iterations during which a wireless device updates a transmission strategy. Similar to the convergence conditions described above, the update schedule can be predetermined by a network operator, manufacturer, etc., or established by the wireless device in a random or pseudo-random fashion. The remaining steps of this embodiment can occur during each time iteration. However, it is to be appreciated that one or more of the following steps need not be performed each and every time iteration. For instance, environment sensing, described below, can occur according to a different schedule from time iterations and transmission strategy updating.

At 710, current environmental information is acquired. According to an example, cognitive radio techniques are leverage to sense electromagnetic conditions in a wireless communication environment to obtain the environmental information. The environmental information can include constraints (e.g., interference constraints, power constraints, etc.), an interference level within the environment, sensed primary users (e.g., primary transmitters and/or primary receivers), transmit covariance matrices employed by other secondary users, or the like. At 720, a current time iteration is determined and the update schedule is analyzed based on the current time iteration. At 730, it is determined whether or not to update a transmission strategy. For instance, for the current time iteration, the update schedule can indicate that the strategy is to be updated. If the strategy is to be updated, then, at 740, the current environmental information is utilized to select a new transmission strategy (e.g., a transmit covariance matrix). If, however, the strategy is not be updated, then at 750, a strategy (e.g., transmit covariance matrix) selected in a previous time iteration is maintained.

Figure 8:
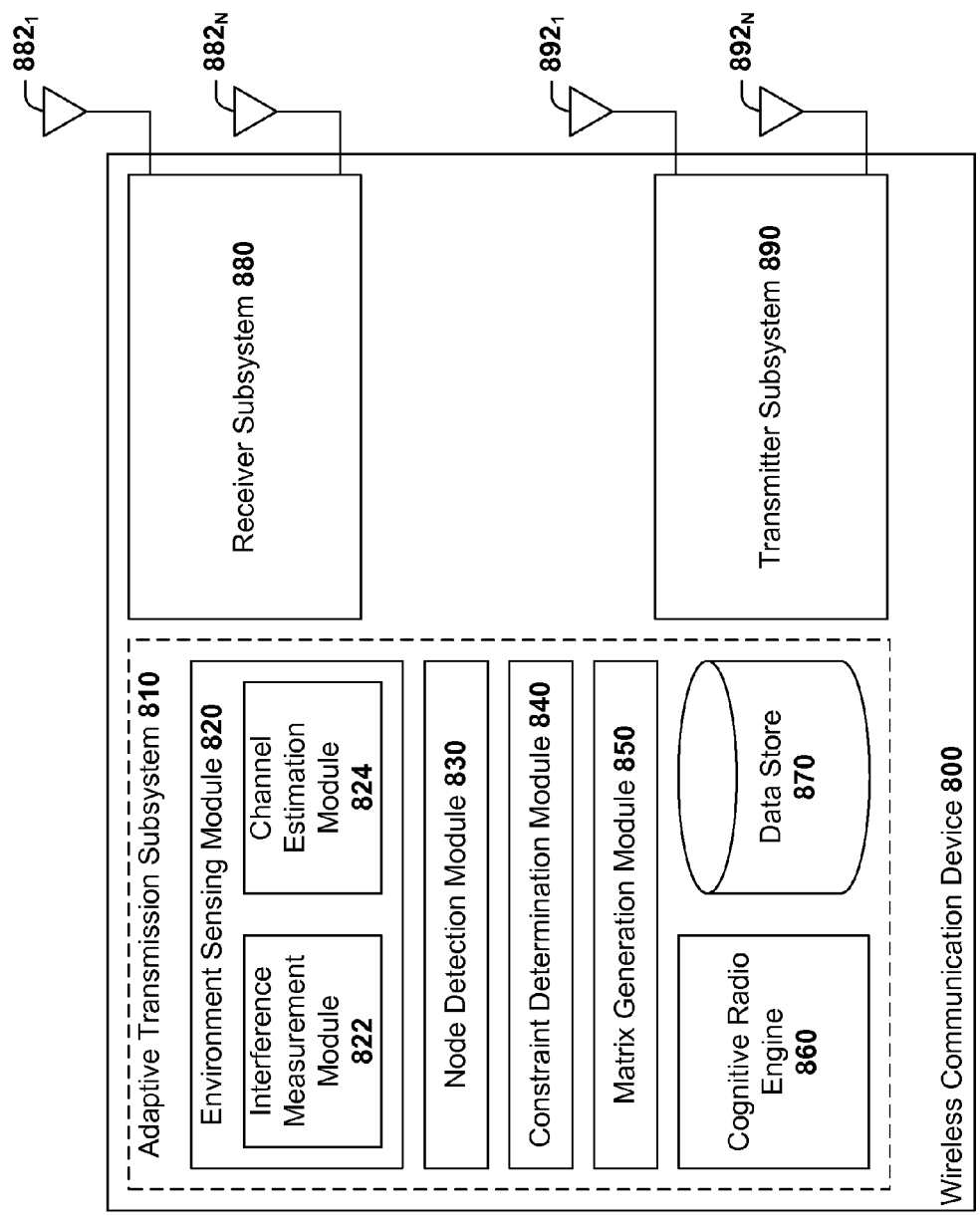
FIG. 8 is a block diagram illustrating an exemplary, non-limiting wireless communication device configured to employ independent adaptation of opportunistic transmissions to achieve a system-wide equilibrium.

FIG. 8 is a block diagram illustrating an exemplary, non-limiting wireless communication device 800 configured to employ independent adaptation of opportunistic transmissions to achieve a system-wide equilibrium. According to an example, wireless communication device 800 can implement embodiments described above in connection with FIGS. 3-7 and, in addition, wireless communication devices 120-150 (e.g., the secondary users) can incorporate similar structures as shown in FIG. 8.

Wireless communication device 800 can include an adaptive transmission subsystem 810 configured to determine a transmission strategy for wireless communication device 800 in a cognitive radio network which includes a plurality of secondary users (e.g., unlicensed users) and a plurality of primary users (e.g., licensed users) sharing a set of common resources (e.g., space, time, and/or frequency resources). The plurality of secondary users, such as wireless communication device 800, utilize opportunistic transmissions to access the set of common resources. Accordingly, the plurality of secondary users compete to individually increase or maximize respective information rates. Such competition can be formulated as a strategic, non-cooperative game, which is applied by adaptive transmission subsystem 810 to implement a transmission strategy for wireless communication device 800 such that the plurality of secondary users converge to an equilibrium within the cognitive radio network.

Adaptive transmission subsystem 810 can include an environment sensing module 820 configured to monitor an environment of the cognitive radio network and gather environmental information. For instance, environment sensing module 820 can include an interference measurement module 822 that can determine an interference level observed by wireless communication device 800. In addition, environmental sensing module 820 can include a channel estimation module 824 that can generate channel estimates of channels utilized by wireless communication device 800 to transmit data, channels utilized by wireless communication device 800 to receive data, and/or channels employed by other users (e.g., secondary and/or primary) of the cognitive radio network for transmissions. According to a further aspect, environment sensing module 820, via interference measurement module 822 and/or channel estimation module 824, can determine covariance matrices employed by other secondary users of the cognitive radio network.

In a further example, adaptive transmission system 810 includes node detection module 830 configured to detect presence, location, and frequency utilization by wireless nodes in the cognitive radio network. The wireless nodes detected can include primary users, where such detections facilitate enforcement of interference constraints that limit interference imposed on primary users. A constraint determination module 840 is provided which is configured to establish a set of constraints (e.g., power constraints, interference constraints, etc.) on transmissions of wireless communication device 800. In an aspect, interference constraints such as null constraints or soft shaping constraints can be formulated by constraint determination module 840 in accordance with node detections provided by node detection module 830. For instance, a null constraint, in a particular direction, can be generated based on a detected presence and location of a primary user which lies along that particular direction.

Adaptive transmission subsystem 810 includes a matrix generation module 850, which is configured to construct a transmit covariance matrix based, at least in part, on the set of constraints established by constraint determination module 840 and environmental conditions determined by environment sensing module 820. A cognitive radio engine 860 is provided which controls other modules of adaptive transmission subsystem 810 and coordinates the various modules through one or more iterations of transmission strategy selection in order to facilitate convergence to a system-wide equilibrium. In addition, a data store 870 is provided to retain data, such as constraints, measurements, estimates, covariance matrices, etc., associated with the various modules of the adaptive transmission subsystem 810.

Wireless communication device 800, as shown in FIG. 8, can include a receiver subsystem 880 coupled to a set of receive antennas $882_{1-N}$, where N is an integer greater than or equal to one. Receiver subsystem 880 can include various components to enable reception of radio signals via the set of receive antennas 882. These components can include structures such as, but not limited to, analog-to-digital converters, mixers, multiplexers, filters, signal processors, decoders, demodulators, and/or the like. Similarly, wireless communication device 800 includes a transmitter subsystem 890 coupled to a set of transmit antennas $892_{1-N}$. Transmitter subsystem 890 can include a plurality of components, such as filters, signal processors, encoders, modulators, upconverters, digital-to-analog converters, etc., utilized to process, convert, and transmit data signal via the set of transmit antennas 892. For instance, transmitter subsystem 890 can utilize a transmit covariance matrix generated by matrix generation module 850 when processing data for transmission via transmitter subsystem 890.

The aforementioned embodiments of a cognitive MIMO transceiver enable deployment of cognitive radio networks that leverage decentralized and distributed access control mechanisms to manage transmissions of secondary users in the presence of primary users. Described below are associated system models, interference models, and/or strategic non-cooperative game models implemented through the embodiments described above in connection with FIGS. 1-8.

System Model and Strategic, Non-Cooperative Game Model

The various embodiments described herein can be implementations of the following mathematical models and representations. As used in this section, uppercase and lowercase boldface denote matrices and vectors, respectively. The operators $(\cdot)^*$, $(\cdot)^H$, $(\cdot)^\dagger$, $\mathbb{E}\{\cdot\}$, and $\mathrm{Tr}(\cdot)$ are conjugate, Hermitian, Moore-Penrose pseudoinverse, expectation, and trace operators, respectively. The range space and null space are denoted by $\mathcal{R}(\cdot)$ and $\mathcal{N}(\cdot)$, respectively. The maximum and minimum eigenvalues of a Hermitian matrix, A, are denoted by $\lambda_{max}(A)$ and $\lambda_{min}(A)$, respectively. The operators ≤ and ≤ for vectors and matrices are defined component-wise, while $A \succeq B$ (or $A \preceq B$) means that A−B is positive (or negative) semidefinite. The operator Diag(·) is a diagonal matrix with the same diagonal elements as the matrix (or vector) argument; bdiag(A, B, ...) is the diagonal matrix whose diagonal blocks are the matrices A, B, ... ; and the operator ⊥ means that two vectors x and y are orthogonal (i.e., $x \perp y \Leftrightarrow x^H y = 0$).

The operators $(\cdot)^+$ and $[\cdot]_a^b$, with $0 \le a \le b$, are defined as $(x)^+ \triangleq \max(0, x)$ and $[x]_b^a \triangleq \min((b, \max(x, a))$, respectively. However, when the argument of the operators is a vector or a matrix, then the operators are applied component-wise. The spectral radius of a matrix A is denoted by $\rho(A)$, and is defined as $\rho(A) \triangleq \max\{|\lambda|:\lambda \in \sigma(A)\}$, with $\sigma(A)$ denoting the spectrum (set of eigenvalues) of A. The operator $P_{\mathcal{N}(A)}$ (or $P_{\mathcal{R}(A)}$) denotes the orthogonal projection onto the null space (or range space) of matrix A, which is given by $P_{\mathcal{N}(A)} = N_A (N_A^H N_A)^{-1} N_A^H$ (or $P_{\mathcal{R}(A)} = R_A (R_A^H R_A)^{-1} R_A^H$), where $N_A$ (or $R_A$) is any matrix whose columns are linear independent vectors spanning $\mathcal{N}(A)$ (or $\mathcal{R}(A)$). The operator $[X]_{\mathcal{G}} = \arg\min_{Z \in \mathcal{G}} \|Z - X\|_F$ denotes the matrix projection with respect to the Frobenius norm of matrix X onto the (convex) set $\mathcal{G}$, where $\|X\|_F$ is defined as $\|X\|_F \triangleq (\text{Tr}(X^H X))^{1/2}$. As further used herein, $I_n$ denotes the n×n identity matrix and the sets $\mathbb{C}$, $\mathbb{R}$, $\mathbb{R}_+$, $\mathbb{R}_{++}$, $\mathbb{N}_+$, and $\mathbb{S}_+^{n \times n}$ (or $\mathbb{S}_{++}^{n \times n}$) stand for the set of complex, real, nonnegative real, positive real, nonnegative integer numbers, and n×n complex positive semidefinite (or definite) matrices, respectively.

With the notation described above, a multiuser environment with Q secondary users and a plurality of primary users, sharing the same physical resources (e.g., time, frequency, and space), can be modeled. The primary and secondary users do not cooperate with each other, and no centralized authority handles network access for the secondary users. Thus, the set of cognitive secondary users can be modeled as a Gaussian vector interference channel, where the transmission over the q-th MIMO channel with $n_{T_q}$ transmit and $n_{R_q}$ receive dimensions is given by the following baseband signal model:

$$y_q = H_{qq} x_q + \Sigma_{r \ne q} H_{rq} x_r + n_q, \quad (1)$$

where $$x_q \in \mathbb{C}^{n_{T_q}}$$

is the vector transmitted by source q, $$y_q \in \mathbb{C}^{n_{R_q}}$$

is the bectore received by destination q, $$H_{qq} \in \mathbb{C}^{n_{R_q} \times n_{T_q}}$$

is the channel matrix between the q-th transmitter and the intended receiver, $$H_{rq} \in \mathbb{C}^{n_{R_q} \times n_{T_q}}$$

is the cross-channel matrix between source r and destination q, and $$n_q \in \mathbb{C}^{n_{R_q}}$$

is a zero-mean circularly symmetric complex Gaussian noise vector with arbitrary (nonsingular) covariance matrix $R_{n_q}$, collecting the effect of both thermal noise and interference generated by the primary users. The first term on the right-hand side of (1) is a useful signal for link q, the second and third terms represent the multi-user interference (MUI) received by secondary user q and with the second term representing the interference caused from the other secondary users and the third term representing the interference caused by the primary users. The power constraint on a transmitter can be expressed as:

$$\in\{\|x_q\|_2^2\} = \text{Tr}(Q_q) \le P_q, \quad (2)$$

where $Q_q$ denotes the covariance matrix of the symbols transmitted by user q and $P_q$ is the transmit power in units of energy per transmission. The model in (1) represents a general MIMO setup, describing multiuser transmissions over multiple channels, which can represent frequency channels (as in OFDM systems), time slots (as in TDMA systems), or spatial channels (as in transmit/receive beamforming systems).

Due to the distributed nature of the system, where neither centralized control or coordination among secondary users occurs, the model offers simplifications by disregarding interference cancellation and treating MUI as additive colored noise at the receivers. The covariance matrix of the of the noise plus MUI can be given by:

$$R_{-q}(Q_{-q}) \triangleq R_{n_q} + \Sigma_{r \ne q} H_{rq} Q_r H_{rq}^H \quad (3)$$

Within the framework provided above, a maximum information rate on link q, for a given set of user covariance matrices $Q_1, \ldots, Q_Q$, can be given by:

$$R_q(Q_q, Q_{-q}) = \log \det(I + H_{qq}^H R_{-q}^{-1}(Q_{-q}) H_{qq} Q_q) \quad (4)$$

where $Q_{-q} \triangleq (Q_r)_{r \ne q}$ is the set of all users' covariance matrices except the q-th one.

Null constraints (e.g., a type of interference constraint as described above) can be modeled according to the following:

$$U_q^H Q_q = 0, \quad (5)$$

where $$U_q \in \mathbb{C}^{n_{T_q} \times n_{R_q}}$$

is a tall matrix whose columns represent the spatial and/or frequency directions along which user q is not allowed to transmit. In an example described herein, matrices $U_q$ are full-column rank and $r_{U_q} < n_{T_q}$.

Soft shaping constraints, as described in practical terms previously, can be modeled as:

$$\text{Tr}(G_q^H Q_q G_q) \le P_{SU,q}^{ave} \text{ and } \lambda_{max}(G_q^H Q_q G_q) \le P_{SU,q}^{peak} \quad (6)$$

which represent a relaxed version of null constraints by indicating a constraint on a total average and peak average power radiated along a range space of matrix $G_q \in$ $$\mathbb{C}^{n_{T_q} \times n_{G_q}},$$

where $P_{SU,q}^{ave}$ and $P_{SU,q}^{peak}$ are maximum average and average peak power, respectively, that can be transmitted along the spatial and/or frequency directions spanned by $G_q$.

Null constraints model an interference-avoiding paradigm of cognitive radio communications, which can also be referred to as a white-space filling approach. For instance, cognitive radio nodes (e.g., such as wireless communication device 800 of FIG. 8 and/or wireless communication devices 120-150 of FIG. 1) can sense the spatial, temporal, and/or spectral voids and can adjust respective transmission strategies to fill in sensed white spaces. Such white space filling is a core aspect of wireless access standards such as IEEE 802.22 directed towards wireless regional area networks (WRANs). The null constraint model presented in (5) is a general form and includes particular cases such as the imposition of nulls over frequency bands occupied by primary users (the range space $U_q$ coincides with the subspace spanned by a set of inverse discrete Fourier transform (IDFT) vectors), time slots used by primary users (the set of canonical vectors), and angular directions identifying the primary receivers as observed from secondary users (the set of steering vectors representing the directions of the primary users as observed from secondary users).

While the white-space filling paradigm typically results in cognitive transmissions (e.g., transmission by secondary users) being orthogonal, e.g., in space, time, or frequency, to primary transmissions, opportunistic communications (as applied by the embodiments above) can involve simultaneous transmissions between primary and secondary users, provided that a QoS of primary users is preserved. In an aspect, the soft shaping constraints presented in (6) model such restrictions as the soft shaping constraints in (6) represent a constraint on a total average and peak average power allowed to be radiated (e.g., projected) along directions spanned by the column space of matrix $G_q$. For instance, in a MIMO system, the matrix $G_q$ can contain, in its columns, steering vectors identifying directions of primary users. According to one example, the power thresholds $P_{SU,q}^{ave}$ and $P_{SU,q}^{peak}$, at respective secondary users, can be established in advance (e.g., imposed by a network service provider, legacy systems, or a spectrum regulatory agency) so that interference-temperature limits at primary users are met. This enables primary users to operate as if secondary users were not present.

The strategic, noncooperative game (e.g., the framework underlying the embodiments described above) provides a setting in which secondary users attempt to maximize information rates (4), subject to power and interference constraints (e.g., expressions (2), (5), and (6)). As presented herein, several formulations of the strategic, noncooperative game can be developed. A first formulation, game $\mathcal{G}_{null}$, includes power constraints (2) and null constraints (5), and thus, is suitable for white-space filling scenarios. Another formulation, $\mathcal{G}_\infty$, possess enhanced convergence properties and is asymptotically equivalent to a third formulation, $\mathcal{G}_\alpha$. Finally, a fourth formulation, $\mathcal{G}_{soft}$, capture general opportunistic communications by encoding soft shaping interference constraints (6).

Given the rate function (4), a strategic, noncooperative rate maximization game among secondary users in the presence of power constraints (2) and null constraints (5) can be defined as:

$$(\mathcal{G}_{null}): \begin{array}{c} \text{maximize} \\ Q_q \succcurlyeq 0 \end{array} R_q(Q_q, Q_{-q}) \qquad (7)$$
$$\text{subject to} \quad Tr(Q_q) \leq P_q, \quad U_q^H Q_q = 0$$

for all $q \in \Omega$, where $\Omega \triangleq \{1, 2, \ldots, Q\}$ is the set of players (e.g., the secondary users) and $R_q(Q_q, Q_{-q})$ is the payoff function of player q defined in (4). Absent null constraints, a solution to the optimization problem presented above leads to a MIMO waterfilling solution. The presence of null constraints modifies the problem such that a waterfilling solution is not always the solutions. However, by introducing a projection matrix, solutions can be determined via a waterfilling-like expression.

To introduce the projection matrix, some intermediate definitions are provided as follows. For any $q \in \Omega$, given $r_{H_{qq}} \triangleq \text{rank}(H_{qq})$ and $r_{U_q} \triangleq \text{rank}(U_q)$, with $$r_{U_q} < n_{T_q}, \text{ let } U_q^\perp \in \mathbb{C}^{n_{T_q} \times r_{U_q^\perp}}$$

be a semi-unitary matrix orthogonal to $U_q$, with $$r_{U_q^\perp} \triangleq \text{rank}(U_q^\perp) = n_{T_q} - r_{U_q} \text{ and } P_{\mathcal{R}(U_q^\perp)} = U_q^\perp U_q^{\perp H}$$

be an orthogonal projection onto $\mathcal{R}(U_q^\perp)$. The null constraints presented in (7) can be rewritten as:

$$Q_q = P_{\mathcal{R}(U_q^\perp)} Q_q P_{\mathcal{R}(U_q^\perp)}, \qquad (8)$$

since $Q_q \succcurlyeq 0$ and also Hermitian. Provided that the original channels $H_{rq}$ are replaced with modified channels $H_{rq} P_{\mathcal{R}(U_q^\perp)}$, the final formulation of the game becomes:

$$\begin{array}{c} \text{maximize} \\ Q_q \succcurlyeq 0 \end{array} \text{logdet}\left(I + P_q^\perp H_{qq}^H \tilde{R}_{-q}^{-1}(Q_{-q}) H_{qq} P_q^\perp Q_q\right) \qquad (9)$$
$$\text{subject to} \quad Tr(Q_q) \leq P_q$$

for all $q \in \Omega$, where $$\tilde{R}_{-q}^{-1}(Q_{-q}) \triangleq R_{n_q} + \sum_{r \neq q} H_{rq} P_r^\perp Q_r P_r^\perp H_{rq}^H > 0$$

The above holds since, for any user q, an optimal solution $Q^*_q$ of (9) is orthogonal to the null space of $H_{qq} P_q^\perp$, whenever $\tilde{R}_{-q}^{-1}(Q_{-q})$ is, implying that $\mathcal{R}(Q^*_q) \subseteq \mathcal{R}(U_q^\perp)$.

Building on the equivalence of (7) and (9), $\mathcal{G}_{null}$ can be fully characterized by providing a structure of a Nash equilibrium of the game and conditions that provide that the equilibrium is unique and that a distributed algorithm, described below, converges. Let $\tilde{\Omega}$ denote a set of user indexes associated with the rank deficient matrices $H_{qq} U_q^\perp$ and be defined as:

$$\tilde{\Omega} \triangleq \{q \in \Omega : r_{H_{qq} U_q^\perp} \triangleq \text{rank}(H_{qq} U_q^\perp) < \min(n_{R_q}, r_{U_q^\perp})\} \qquad (11)$$

and let $$V_{q,1} \in \mathbb{C}^{r_{U_q^\perp} \times r_{H_{qq} U_q^\perp}}$$

be semi-unitary matrices such that $\mathcal{R}(V_{q,1}) = \mathcal{N}(H_{qq} U_q^\perp)^\perp$. Based on these definitions, a lower dimensional (with respect to original channels) modified channel matrices $$\tilde{H}_{rq} \in \mathbb{C}^{n_{R_q} \times r_{H_{rr} U_r^\perp}}$$

is introduced and defined as:

$$\tilde{H}_{rq} = \begin{cases} H_{rq}U_r^\perp V_{r,1}, & \text{if } r \in \tilde{\Omega} \\ H_{rq}U_r^\perp, & \text{otherwise} \end{cases} \quad \forall r, q \in \Omega \quad (12)$$

Further, a nonnegative matrix $S_{null} \in \mathbb{R}_+^{Q \times Q}$ is introduced and defined as:

$$[S_{null}]_{qr} \triangleq \begin{cases} \overline{\text{innr}}_q \cdot \rho(\tilde{H}_{rq}^H \tilde{H}_{rq})\rho(\tilde{H}_{qq}^H \tilde{H}_{qq}), & \text{if } r \neq q \\ 0, & \text{otherwise} \end{cases} \quad (13)$$

with $$\overline{\text{innr}}_q \triangleq \frac{\rho\left(R_{n_q} + \sum_{r \neq q} P_r \tilde{H}_{rq} \tilde{H}_{rq}^H\right)}{\lambda_{min}(R_{n_q})} \geq 1 \quad (14)$$

Finally, to express the Nash equilibrium in a convenient form, a MIMO waterfilling operator, $WF_q : \mathbb{S}_+^{n_q \times n_q} \ni X \to \mathbb{S}_+^{n_q \times n_q}$, for any $q \in \Omega$ and given $n_q \in \{1, 2, \ldots, n_{T_q}\}$, is introduced and defined as:

$$WF_q(X) \triangleq U_X(\mu_{q,X}I_{r_X} - D_X^{-1})^+ U_X^H \quad (15)$$

where $U_X \in \mathbb{C}^{n_q \times r_X}$ and $D_X \in \mathbb{R}_{++}^{r_X \times r_X}$ are the (semi-)unitary matrix of the eigenvectors and the diagonal matrix of the $r_X \triangleq \text{rank}(X) \leq n_q$ (positive) eigenvalues of X, respectively, and $\mu_{q,X} > 0$ is the water-level chosen to satisfy $\text{Tr}\{(\mu_{q,X}I_{r_X} - D_X^{-1})^+\} = P_q$.

With the definition above, then, for game $\mathcal{G}_{null}$, while supposing, without loss of generality, that $r_{U_q} < n_{T_q}$, for all $q \in \Omega$, the following holds: (a) there exists a Nash equilibrium for any set of channel matrices, power constraints for users, and null constraints; (b) all Nash equilibria are solutions to the following set of nonlinear matrix-value fixed-point equations:

$$Q^*_q = U_q^\perp WF_q(U_q^{\perp H} H_{qq}^H \tilde{R}_{-q}^{-1}(Q^*_{-q}) H_{qq} U_q^\perp) U_q^{\perp H},$$
$$\forall q \in \Omega; \quad (16)$$

and (c) the Nash equilibrium is unique if $$\rho(S_{null}) < 1. \quad (C1)$$

As a sufficient condition for (C1), one of the two following set of conditions can be given:

$$\frac{1}{w_q} \sum_{r \neq q} \overline{\text{innr}}_q \cdot \rho(\tilde{H}_{rq}^H \tilde{H}_{rq})\rho(\tilde{H}_{qq}^H \tilde{H}_{qq}) w_r < 1, \quad \forall q \in \Omega \quad (C2)$$

for low received MUI and $$\frac{1}{w_r} \sum_{q \neq r} \overline{\text{innr}}_q \cdot \rho(\tilde{H}_{rq}^H \tilde{H}_{rq})\rho(\tilde{H}_{qq}^H \tilde{H}_{qq}) w_q < 1, \quad \forall r \in \Omega \quad (C3)$$

for low generated MUI, where $w \triangleq [w_1, \ldots, w_Q]^T$ is any positive vector.

The structure of the Nash equilibrium, as given in (16), indicates that null constraints in transmission of secondary users can be handled with affecting computational complexity. In other words, an optimal transmission strategy for each user q can be generated via a MIMO waterfilling solution, provided that the original channel matrix $H_{qq}$ is replaced by $H_{qq}U_q^\perp$. The structure of the covariance matrix in (16) enables an intuitive interpretation. To guarantee that each user q does not transmit over a subspace (spanned by the columns of $U_q$), regardless of the strategies of other users, while maximizing respective information rates, it is sufficient to induce, in the original channel matrix $H_{qq}$, a null space that coincides with the subspace where the transmission is not allowed.

Conditions (C1)-(C3) state that uniqueness of the Nash equilibrium is ensured if the interference among secondary users is sufficiently small. The same conditions can be shown to be sufficient also for convergence of the distributed algorithms. Conditions (C1)-(C3) quantify an interference threshold under which an equilibrium is guaranteed unique. For instance, condition (C2) can represent a constraint on a maximum amount of interference a receiver can tolerate and condition (C3) can represent an upper bound on a maximum level of interference that a transmitter of the secondary users is allowed to generate.

Within the framework provided above, distributed algorithms can be devised which converge to a Nash equilibrium of $\mathcal{G}_{null}$. Such algorithms can be asynchronous in that that some users can change strategies more frequently than others and such updates can be based on outdate information on interference generated by the others.

A set of times at which one or more users update strategies is a discrete set $\mathbb{N} = \mathcal{T}_+ = \{0, 1, 2, \ldots\}$. Let $Q_q^{(n)}$ denote the covariance matrix of a vector signal transmitted by user q at the n-th iteration, and let $\mathcal{T}_q \subseteq \mathcal{T}$ denote the set of times n at which $Q_q^{(n)}$ is updated (e.g., at time $n \notin \mathcal{T}_q$, $Q_q^{(n)}$ is left unchanged). Let $r_r^q(n)$ denote the most recent time at which the interference from user r is perceived by user q at the n-th iteration, where $r_r^q(n)$ satisfies $0 \leq r_r^q(n) \leq n$. Thus, if user q updates a covariance matrix at the n-th iteration, then user q generates $Q_q^{(n)}$ based on the following:

$$T_q(Q_{-q}) \triangleq U_q^\perp WF_q(U_q^{\perp H} H_{qq}^H R_{-q}^{-1}(Q_{-q}) H_{qq} U_q^\perp)$$
$$U_q^{\perp H} \quad (17)$$

and an interference level given by:

$$Q_{-q}^{(r^q(n))} \triangleq \left(Q_1^{(r_1^q(n))}, \ldots, Q_{q-1}^{(r_{q-1}^q(n))}, Q_{q+1}^{(r_{q+1}^q(n))}, \ldots, Q_Q^{(r_Q^q(n))}\right) \quad (18)$$

Using the above notation, an asynchronous, distributed algorithm can be devised, where the best response $T_q(\bullet)$, for every user $q \in \Omega$, is given in (17). The algorithm can be represented as follows:
Data: any feasible $Q_q^{(0)}$, $\forall q \in \Omega$;
1: Set n=0;
2: repeat $$3: Q_q^{(n+1)} = \begin{cases} T_q(Q_{-q}^{(r^q(n))}), & \text{if } n \in \mathcal{T}_q \\ Q_q^{(n)}, & \text{otherwise} \end{cases}; \forall q \in \Omega \quad (19)$$

4: until the prescribed convergence criterion is satisfied

The algorithm above includes, as special cases, a plethora of algorithms, respectively obtained by a possible choice of user scheduling in the updating procedure (e.g., choice of parameters $\{r_r^q(n)\}$ and $\{\mathcal{T}_q\}$). Two such special cases are the sequential and the simultaneous schemes, where the users update respective strategies either sequentially or simultaneously. Even with null constraints, the best-response $T_q(\cdot)$ of each user q can be efficiently computed via MIMO waterfilling. Accordingly, the algorithm above can be implemented in a distributed way since each user can readily measure an overall interference-plus-noise covariance matrix $R_{-q}$ and waterfill over $U_q^{\perp H} H_{qq}^H R_{-q}^{-1}(Q_{-q}) H_{qq} U_q^{\perp}$. Another feature of the distributed algorithm is its robustness against missing or outdated updates of other secondary users, nor does the distributed algorithm violate interference-temperature limits.

The game $\mathcal{G}_{null}$ is associated with conditions (C1)-(C3) that influence convergence behavior. Such conditions, however, depend on the interference generated by the primary users and, as such, may not be satisfied for some interference profiles. To address this, another technique described below imposes null constraints on secondary users by introducing virtual interferers. This leads to a different game formulation with relaxed convergence and uniqueness conditions. Nash equilibria of the new formulation have different structures, which are described below, but, numerically, provide similar sum-rate performance as $\mathcal{G}_{null}$.

The approach of the new formulation can be understood by considering an example of a transmission over single-input, single-output (SISO) frequency-selective channels, where the channel matrices have the same eigenvectors. To avoid using a given subchannel, virtual noise is introduced having sufficiently high power over that subchannel. Extending this concept to a strategic, noncooperative game, the following formulation can be used:

$$(\mathcal{G}_\alpha): \begin{array}{c} \text{maximize} \\ Q_q \succeq 0 \end{array} \quad \text{logdet}(I + H_{qq}^H \tilde{R}_{-q,\alpha}^{-1}(Q_{-q}) H_{qq} Q_q) \quad (20)$$
$$\text{subject to} \quad Tr(Q_q) \leq P_q$$

for all $q \in \Omega$, where $$R_{-q,\alpha}(Q_{-q}) \triangleq R_{n_q} + \Sigma_{r \neq q} H_{rq} Q_r H_{rq}^H + \alpha \hat{U}_q \hat{U}_q^H \succ 0 \quad (21)$$

denotes the MUI-plus-noise covariance matrix observed by secondary user q, plus the covariance matrix $\alpha \hat{U}_q \hat{U}_q^H$ of the virtual interference along $\mathcal{R}(\hat{U}_q)$, where $\hat{U}_q \in$ $$\mathbb{C}^{n_{R_q} \times r_{\hat{U}_q}}$$

is a tall matrix assumed to be full column-rank with $$r_{\hat{U}_q} \triangleq \text{rank}(\hat{U}_q) < r_{H_{qq}}(=n_{T_q}=n_{R_q}),$$

and $\alpha$ is a positive constant.

An auxiliary game, $\mathcal{G}_\infty$, is introduced to discover the asymptotic properties of solutions of $\mathcal{G}_\alpha$, as $\alpha \to +\infty$ and the structure of $\hat{U}_q$ which satisfy the null constraints. Game, $\mathcal{G}_\infty$, can be formulated as follows:

$$(\mathcal{G}_\infty): \begin{array}{c} \text{maximize} \\ Q_q \succeq 0 \end{array} \quad \text{logdet}(I + \hat{H}_{qq}^H \hat{R}_{-q,\alpha}^{-1}(Q_{-q}) \hat{H}_{qq} Q_q) \quad (22)$$
$$\text{subject to} \quad Tr(Q_q) \leq P_q$$

for all $q \in \Omega$, where $$\hat{R}_{-q}(Q_{-q}) \triangleq \hat{U}_q^{\perp H} R_{n_q} \hat{U}_q^{\perp} + \Sigma_{r \neq q} \hat{H}_{rq} Q_r \hat{H}_{rq}^H, \quad (23)$$

the modified channel matrices $$\hat{H}_{rq} \in \mathbb{C}^{r_{\hat{U}_q}^{\perp} \times n_{T_r}}$$

are defined as $$\hat{H}_{rq} = \hat{U}_q^{\perp H} H_{rq} \quad \forall r, q \in \Omega, \quad (24)$$

and $$\hat{U}_q^{\perp} \in \mathbb{C}^{n_{R_q} \times r_{\hat{U}_q}^{\perp}}$$

is the tall full column-rank matrix orthogonal to $\hat{U}_q$, with $r_{\hat{U}_q^{\perp}} = n_{R_q} - r_{\hat{U}_q} = \text{rank}(\hat{U}_q^{\perp})$.

To describe the Nash equilibria of $\mathcal{G}_\infty$ and $\mathcal{G}_\alpha$, several nonnegative matrices S, $S_\infty \in \mathbb{R}_+^{Q \times Q}$ are introduced and defined as:

$$[S]_{qr} \triangleq \begin{cases} \rho(H_{rq}^H H_{qq}^{-H} H_{qq}^{-1} H_{rq}), & \text{if } r \neq q \\ 0. & \text{otherwise} \end{cases} \quad (25)$$

$$[S_\infty]_{qr} \triangleq \begin{cases} \rho(\hat{H}_{rq}^H \hat{H}_{qq}^{-H} \hat{H}_{qq}^{-1} \hat{H}_{rq}), & \text{if } r \neq q \\ 0. & \text{otherwise} \end{cases} \quad (26)$$

With the definitions above, then, for game $\mathcal{G}_\alpha$, the following holds: (a) there exists a Nash equilibrium for any set of channel matrices, transmit power of the users, virtual interference matrices $\hat{U}_q \hat{U}_q^H$, and $\alpha \geq 0$; (b) all Nash equilibria are solutions to the following set of nonlinear matrix-value fixed-point equations:

$$Q^*_{q,\alpha} = WF_q(H_{qq}^H R_{-q,\alpha}^{-1}(Q^*_{-q,\alpha}) H_{qq}), \forall q \in \Omega; \quad (27)$$

and (c) the Nash equilibrium is unique if $$\rho(S) < 1. \quad (C4)$$

As seen above, the Nash equilibria of $\mathcal{G}_\alpha$ depend on $\alpha$ and the virtual interference covariance matrices $\hat{U}_q \hat{U}_q^H$ and the convergence of asynchronous algorithms is not affected by the presence of primary users.

For game $\mathcal{G}_\infty$, while supposing, without loss of generality, that $r_{\hat{U}_q} < r_{H_{qq}}(=n_{R_q}=n_{T_q})$, for all $q \in \Omega$, the following holds: (a) there exists a Nash equilibrium for any set of channel matrices, transmit power of the users, and virtual interference matrices $U_q$; (b) all Nash equilibria are solutions to the following set of nonlinear matrix-value fixed-point equations:

$$Q^*_{q,\infty} = WF_q(\hat{H}_{qq}^H \hat{R}_{-q}^{-1}(Q^*_{-q,\infty}) \hat{H}_{qq}), \forall q \in \Omega \quad (28)$$

and satisfy $\mathcal{R}(Q^*_{q,\infty}) \perp \mathcal{R}(H_{qq}^{-1} \hat{U}_q)$, for all $q \in \Omega$; and (c) the Nash equilibrium is unique if $$\rho(S_\infty) < 1. \quad (C5)$$

The orthogonality property stated above provides, for each user q, the relationship between directions of the virtual noise to be introduced and the noise covariance matrix of the user—the matrix $\hat{U}_q$—and real directions along which user q does not allocate power (e.g., the matrix $U_q$). When user q is not allowed to allocate power along $U_q$, then it is sufficient to choose $\hat{U}_q \triangleq H_{qq} U_q$. Given this choice, the structure of the Nash equilibrium can become the following:

$$Q^*_{q,\infty} = U_q^{\perp} WF_q((U_q^{\perp H} H_{qq}^{-1} R_{-q}(Q^*_{-q,\infty}) H_{qq}^{-H} U_q^{\perp})^{-1}) U_q^{\perp H}, \forall q \in \Omega \quad (29)$$

Given $\mathcal{G}_\infty$ and $\mathcal{G}_\alpha$, the asymptotic behavior of the Nash equilibria of $\mathcal{G}_\alpha$, as $\alpha \to \infty$, can be described as follows. The following hold when $r_{\bar{U}_q} < r_{H_{qq}}$ ($=n_{R_q}=n_{T_q}$) for all $q \in \Omega$ and condition (C4) is satisfied: (a) $\mathcal{G}_\infty$ and $\mathcal{G}_\alpha$ admit a unique Nash equilibrium denoted by $Q^*_\infty$ and $Q^*_\alpha$, respectively; and (b) the two games are asymptotically equivalent, in the sense that $$\lim_{\alpha \to \infty} Q^*_\alpha = Q^*_\infty \qquad (30)$$

To establish a distributed algorithm based on $\mathcal{G}_\infty$ and $\mathcal{G}_\alpha$, the algorithm described above for $\mathcal{G}_{null}$ can also be utilized. In particular, within that algorithm, the best-response $T_q(\bullet)$ of each user q becomes:

$$T_{q,\alpha}(Q_{-q}) \triangleq WF_q(U_q^{\perp H} H_{qq}^H R_{-q,\alpha}^{-1}(Q_{-q})H_{qq}) \qquad (31)$$

In yet another aspect, a strategic, noncooperative rate maximization game, in the presence of null and soft shaping constraints, can be formulated as follows:

$$(\mathcal{G}_{soft}): \qquad (32)$$

$$\underset{Q_q \succeq 0}{\text{maximize}} \quad R_q(Q_q, Q_{-q})$$

$$\text{subject to} \quad Tr(G_q^H Q_q G_q) \le P_q^{ave}, \lambda_{max}(G_q^H Q_q G_q) \le P_q^{peak}, U_q^H Q_q = 0$$

for all $q \in \Omega$, where both types of soft shaping constraints and the null constraints have been incorporated. The transmit power constraint (2) is shown absorbed into the trace soft constraint.

Before describing Nash equilibria of $\mathcal{G}_{soft}$, some intermediate definitions are presented. For any $q \in \Omega$, the tall matrix $$\bar{U}_q \in \mathbb{C}^{n_{G_q} \times r_{U_q}}$$

as $\bar{U}_q \triangleq G_q U_q$, and the semi-unitary matrix $$\bar{U}_q^\perp \in \mathbb{C}^{n_{G_q} \times r_{U_q^\perp}}$$

orthogonal to $\bar{U}_q$, with $r_{\bar{U}_q^\perp} = n_{G_q} - r_{U_q} = \text{rank}(\bar{U}_q^\perp)$. Based on these definitions, the modified channels $$\bar{H}_{rq} \in \mathbb{C}^{n_{R_q} \times r_{U_q^\perp}}$$

are defined as:

$$\bar{H}_{rq} = H_{rq} G_r^H \bar{U}_r^\perp, \forall r,q \in \Omega \qquad (33)$$

and a nonnegative matrix $S_{soft} \in \mathbb{R}_+^{Q \times Q}$ is defined as:

$$[S_{soft}]_{qr} \triangleq \begin{cases} (\overline{innr})_q \cdot \rho(\bar{H}_{rq}^H \bar{H}_{rq})\rho(\bar{H}_{qq}^H \bar{H}_{qq}), & \text{if } r \ne q \\ 0, & \text{otherwise} \end{cases} \qquad (34)$$

with $$\overline{innr}_q \triangleq \frac{\rho\left(R_{n_q} + \sum_{r \ne q} P_r \bar{H}_{rq} \bar{H}_{rq}^H\right)}{\lambda_{min}(R_{n_q})} \ge 1. \qquad (35)$$

Finally, to express the Nash equilibrium in a convenient form, a modified MIMO waterfilling operator, $\overline{WF}_q$: $\mathbb{S}_+^{n_q \times n_q} \ni X \to \mathbb{S}_+^{n_q \times n_q}$, for any $q \in \Omega$ and given $n_q \in \{1, 2, \ldots, n_{T_q}\}$, is introduced and defined as:

$$\overline{WF}_q(X) \triangleq U_X[\mu_{q,X} I_{r_X} - D_X^{-1}]_0^{P_q^{peak}} U_X^H \qquad (36)$$

where $U_X \in \mathbb{C}^{n_q \times r_X}$ and $D_X \in \mathbb{R}_{++}^{r_X \times r_X}$ are the (semi-)unitary matrix of the eigenvectors and the diagonal matrix of the $r_X \triangleq \text{rank}(X) \le n_q$ (positive) eigenvalues of X, respectively, and $\mu_{q,X} > 0$ is the water-level chosen to satisfy $$Tr\left\{[\mu_{q,X} I_{r_X} - D_X^{-1}]_0^{P_q^{peak}}\right\} = \min(P_q, r_X P_q^{peak}).$$

With the definition above, then, for game $\mathcal{G}_{soft}$, while supposing, without loss of generality, that $r_{G_q} < n_{T_q}$, for all $q \in \Omega$, the following holds: (a) there exists a Nash equilibrium for any set of channel matrices, and null/soft constraints; and (b) all Nash equilibria are solutions to the following set of nonlinear matrix-value fixed-point equations:

$$Q^*_q = G_q^H \bar{U}_q^\perp \overline{WF}_q(\bar{H}_{qq}^H R_{-q}^{-1}(Q^*_{-q})\bar{H}_{qq})\bar{U}_q^{\perp H} G_q,$$
$$\forall q \in \Omega \qquad (37)$$

To establish a distributed algorithm based on $\mathcal{G}_{soft}$, the algorithm described above for $\mathcal{G}_{null}$ can also be utilized. In particular, within that algorithm, the best-repsonse $T_q(\bullet)$ of each user q becomes:

$$T_q(Q_{-q}) \triangleq G_q^H \bar{U}_q^\perp \overline{WF}_q(\bar{H}_{qq}^H R_{-q}^{-1}(*_{-q})\bar{H}_{qq})\bar{U}_q^{\perp H} G_q \qquad (38)$$

Exemplary Networked and Distributed Environments

One of ordinary skill in the art can appreciate that the various embodiments of opportunistic communications of cognitive radios described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage. The embodiments described herein can also be applied to standalone computing devices, having programming language functionality, interpretation and execution capabilities for generating, receiving and transmitting information in connection with remote or local services and processes.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in determining transmission strategies for a cognitive radio as described for various embodiments of the subject disclosure.

Figure 9:
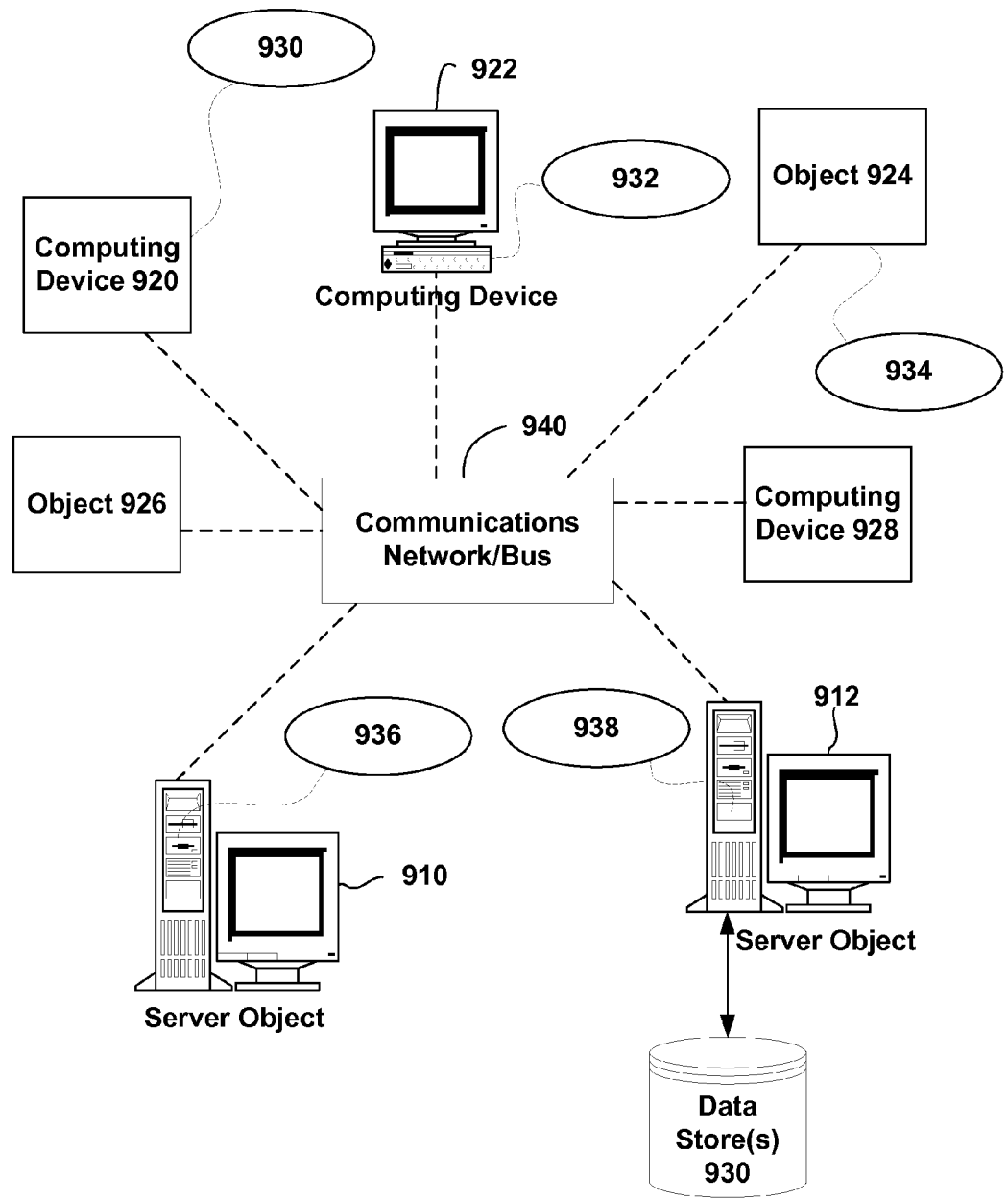
FIG. 9 is a block diagram representing exemplary non-limiting networked environments in which various embodiments described herein can be implemented.

FIG. 9 provides a schematic diagram of an exemplary networked or distributed computing environment. The distributed computing environment comprises computing objects 910, 912, etc. and computing objects or devices 920, 922, 924, 926, 928, etc., which may include programs, methods, data stores, programmable logic, etc., as represented by applications 930, 932, 934, 936, 938. It can be appreciated that computing objects 910, 912, etc. and computing objects or devices 920, 922, 924, 926, 928, etc. may comprise different devices, such as personal digital assistants (PDAs), audio/video devices, mobile phones, MP3 players, personal computers, laptops, etc.

Each computing object 910, 912, etc. and computing objects or devices 920, 922, 924, 926, 928, etc. can communicate with one or more other computing objects 910, 912, etc. and computing objects or devices 920, 922, 924, 926, 928, etc. by way of the communications network 940, either directly or indirectly. Even though illustrated as a single element in FIG. 9, communications network 940 may comprise other computing objects and computing devices that provide services to the system of FIG. 9, and/or may represent multiple interconnected networks, which are not shown. Each computing object 910, 912, etc. or computing object or device 920, 922, 924, 926, 928, etc. can also contain an application, such as applications 930, 932, 934, 936, 938, that might make use of an API, or other object, software, firmware and/or hardware, suitable for communication with or implementation of the advisory services network and associated mechanisms in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 9, as a non-limiting example, computing objects or devices 920, 922, 924, 926, 928, etc. can be thought of as clients and computing objects 910, 912, etc. can be thought of as servers where computing objects 910, 912, etc., acting as servers provide data services, such as receiving data from client computing objects or devices 920, 922, 924, 926, 928, etc., storing of data, processing of data, transmitting data to client computing objects or devices 920, 922, 924, 926, 928, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 940 or bus is the Internet, for example, the computing objects 910, 912, etc. can be Web servers with which other computing objects or devices 920, 922, 924, 926, 928, etc. communicate via any of a number of known protocols, such as the hypertext transfer protocol (HTTP). Computing objects 910, 912, etc. acting as servers may also serve as clients, e.g., computing objects or devices 920, 922, 924, 926, 928, etc., as may be characteristic of a distributed computing environment.

Exemplary Computing Device

As mentioned, advantageously, the techniques described herein can be applied to any device where it is desirable to determine transmission strategies for opportunistic communications via physical radio resources of a licensed spectrum as described herein. It can be understood, therefore, that handheld, portable and other computing devices and computing objects of all kinds are contemplated for use in connection with the various embodiments, i.e., anywhere that a device can transmit and/or receive information wirelessly. Accordingly, the below general purpose remote computer described below in FIG. 10 is but one example of a computing device.

Embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 10:
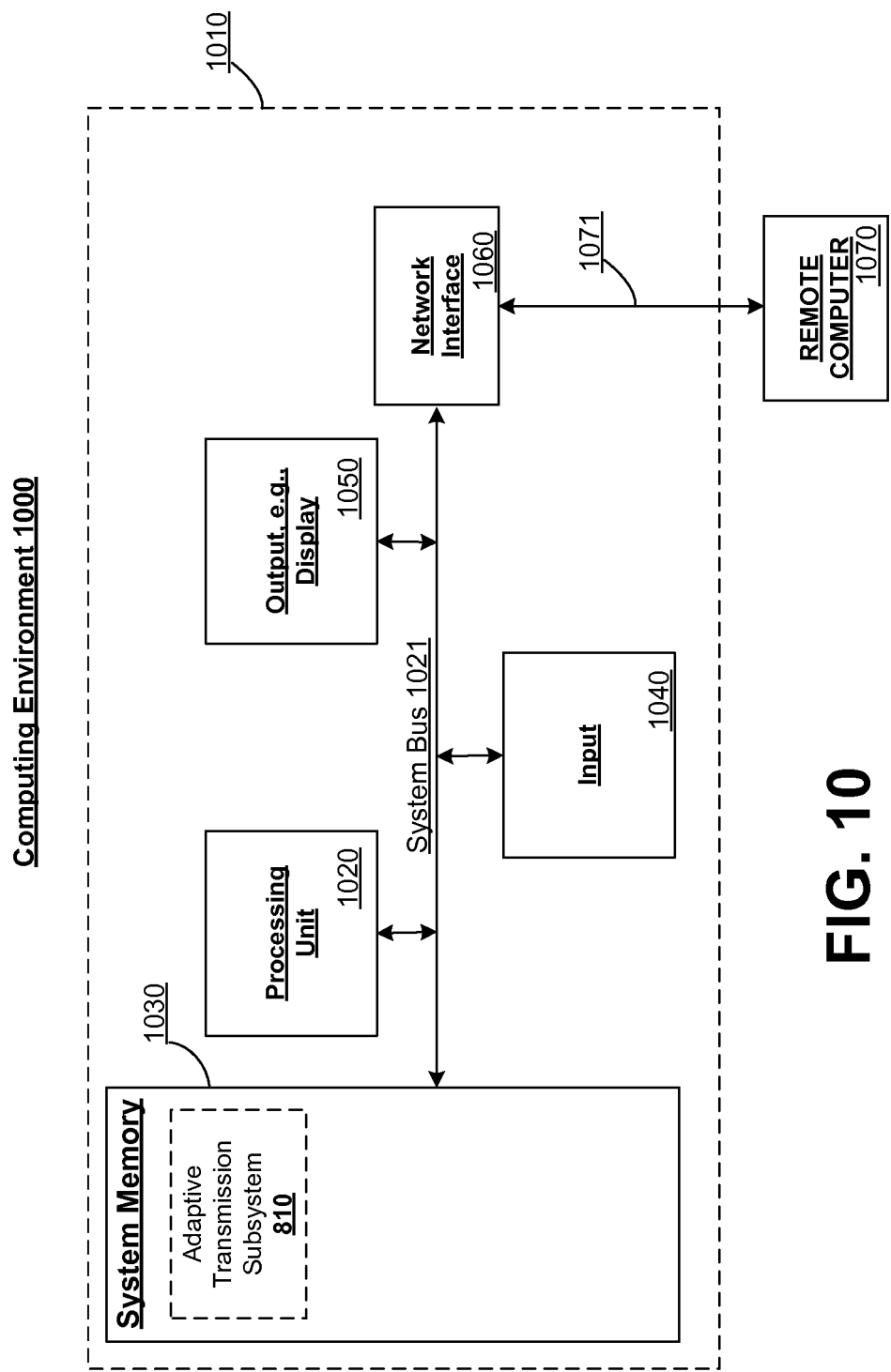
FIG. 10 is a block diagram representing an exemplary non-limiting computing system or operating environment in which one or more aspects of various embodiments described herein can be implemented.

FIG. 10 thus illustrates an example of a suitable computing system environment 1000 in which one or aspects of the embodiments described herein can be implemented, although as made clear above, the computing system environment 1000 is only one example of a suitable computing environment and is not intended to suggest any limitation as to scope of use or functionality. In addition, the computing system environment 1000 is not intended to be interpreted as having any dependency relating to any one or combination of components illustrated in the exemplary computing system environment 1000.

With reference to FIG. 10, an exemplary remote device for implementing one or more embodiments includes a general purpose computing device in the form of a computer 1010. Components of computer 1010 may include, but are not limited to, a processing unit 1020, a system memory 1030, and a system bus 1022 that couples various system components including the system memory to the processing unit 1020.

Computer 1010 typically includes a variety of computer readable media and can be any available media that can be accessed by computer 1010. The system memory 1030 may include computer storage media in the form of volatile and/or nonvolatile memory such as read only memory (ROM) and/or random access memory (RAM). By way of example, and not limitation, system memory 1030 may also include an operating system, application programs, other program modules, and program data. According to a further example, computer 2610 can also include a variety of other media (not shown), which can include, without limitation, RAM, ROM, EEPROM, flash memory or other memory technology, compact disk (CD) ROM, digital versatile disk (DVD) or other optical disk storage, magnetic cassettes, magnetic tape, magnetic disk storage or other magnetic storage devices, or other tangible and/or non-transitory media which can be used to store desired information.

A user can enter commands and information into the computer 1010 through input devices 1040. A monitor or other type of display device is also connected to the system bus 1022 via an interface, such as output interface 1050. In addition to a monitor, computers can also include other peripheral output devices such as speakers and a printer, which may be connected through output interface 1050.

The computer 1010 may operate in a networked or distributed environment using logical connections to one or more other remote computers, such as remote computer 1070. The remote computer 1070 may be a personal computer, a server, a router, a network PC, a peer device or other common network node, or any other remote media consumption or transmission device, and may include any or all of the elements described above relative to the computer 1010. The logical connections depicted in FIG. 10 include a network 1072, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to implement a game for real-world application.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

Exemplary Communications Networks and Environments

The above-described communication systems enabling opportunistic access by secondary users (e.g., unlicensed users) using a distributed, decentralized approach of selecting transmission strategies can be applied to any network, however, the following description sets forth some exemplary telephony radio networks and non-limiting operating environments for communications made incident to the communication systems using the embodiment disclosed herein. The below-described operating environments should be considered non-exhaustive, however, and thus the below-described network architecture merely shows one network architecture into which the disclosed subject matter may be incorporated. One can appreciate, however, that the disclosed subject matter may be incorporated into any now existing or future alternative architectures for communication networks as well.

The global system for mobile communication ("GSM") is one of the most widely utilized wireless access systems in today's fast growing communication systems. GSM provides circuit-switched data services to subscribers, such as mobile telephone or computer users. General Packet Radio Service ("GPRS"), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications.

As one of ordinary skill in the art can appreciate, the exemplary GSM/GPRS environment and services described herein can also be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), Long Term Evolution ("LTE"), LTE-Advanced, etc., as well as to other network services that shall become available in time. In this regard, the opportunistic transmission techniques described herein can be applied independently of the method of data transport, and does not depend on any particular network architecture, or underlying protocols.

Figure 11:
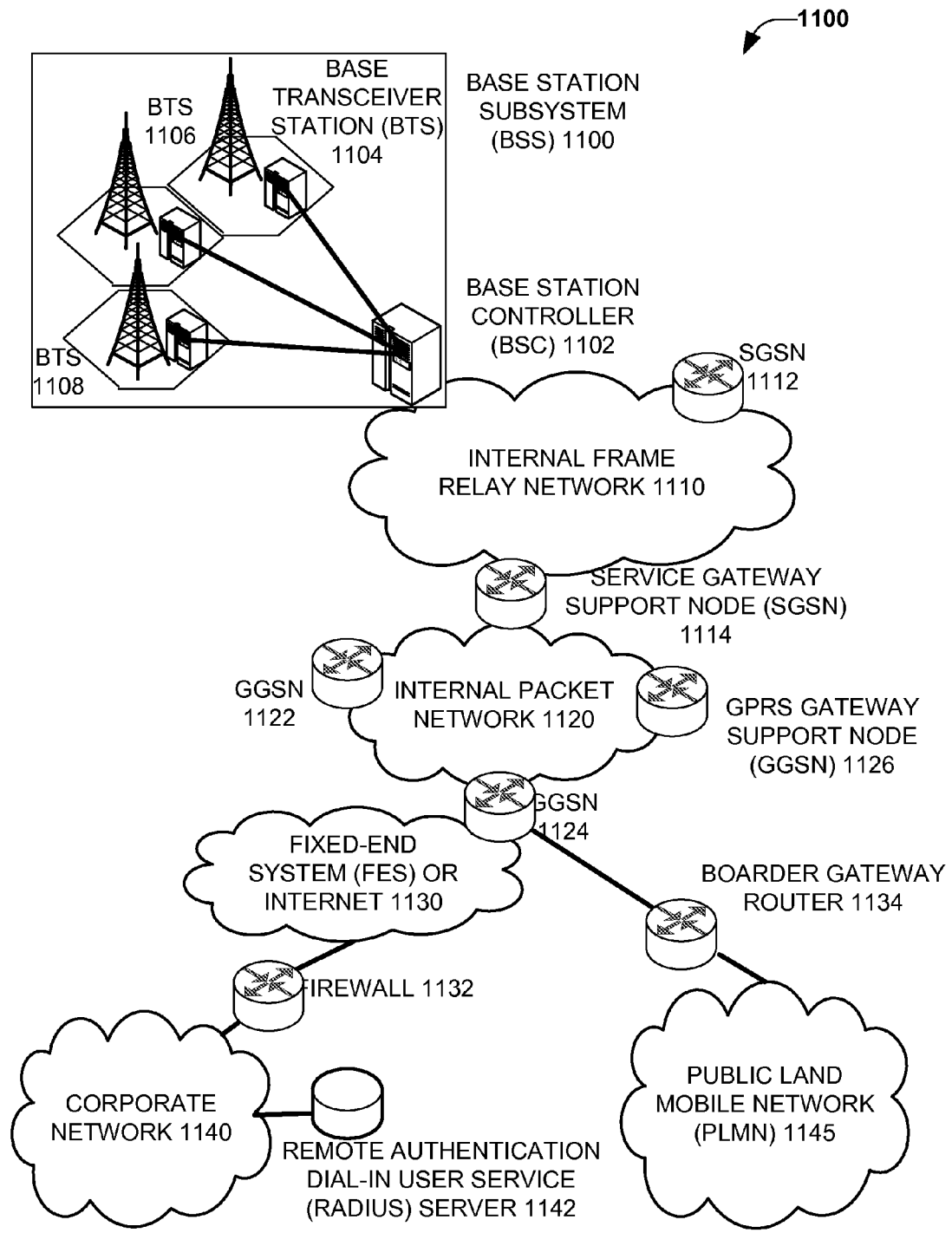
FIG. 11 illustrates an overview of a network environment suitable for service by embodiments of the disclosed subject matter.

FIG. 11 depicts an overall block diagram of an exemplary packet-based mobile cellular network environment, such as a GPRS network, in which the disclosed subject matter may be practiced. In such an environment, there are a plurality of Base Station Subsystems ("BSS") 1100 (only one is shown), each of which comprises a Base Station Controller ("BSC") 1102 serving a plurality of Base Transceiver Stations ("BTS") such as BTSs 1104, 1106, and 1108. BTSs 1104, 1106, 1108, etc. are the access points where users of packet-based mobile devices become connected to the wireless network. In exemplary fashion, the packet traffic originating from user devices is transported over the air interface to a BTS 1108, and from the BTS 1108 to the BSC 1102. Base station subsystems, such as BSS 1100, are a part of internal frame relay network 1110 that may include Service GPRS Support Nodes ("SGSN") such as SGSN 1112 and 1114. Each SGSN is in turn connected to an internal packet network 1120 through which a SGSN 1112, 1114, etc. can route data packets to and from a plurality of gateway GPRS support nodes (GGSN) 1122, 1124, 1126, etc. As illustrated, SGSN 1114 and GGSNs 1122, 1124, and 1126 are part of internal packet network 1120. Gateway GPRS serving nodes 1122, 1124 and 1126 mainly provide an interface to external Internet Protocol ("IP") networks such as Public Land Mobile Network ("PLMN") 1145, corporate intranets 1140, or Fixed-End System ("FES") or the public Internet 1130. As illustrated, subscriber corporate network 1140 may be connected to GGSN 1124 via firewall 1132; and PLMN 1145 is connected to GGSN 1124 via boarder gateway router 1134. The Remote Authentication Dial-In User Service ("RADIUS") server 1142 may be used for caller authentication when a user of a mobile cellular device calls corporate network 1140.

Generally, there can be four different cell sizes in a GSM network—macro, micro, pico and umbrella cells. The coverage area of each cell is different in different environments. Macro cells can be regarded as cells where the base station antenna is installed in a mast or a building above average roof top level. Micro cells are cells whose antenna height is under average roof top level; they are typically used in urban areas. Pico cells are small cells having a diameter is a few dozen meters; they are mainly used indoors. On the other hand, umbrella cells are used to cover shadowed regions of smaller cells and fill in gaps in coverage between those cells.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

Thus, the systems of the disclosed subject matter, or certain aspects or portions thereof, may take the form of program code (e.g., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the disclosed subject matter. In the case of program code execution on programmable computers, the computing device generally includes a processor, a storage medium readable by the processor (including volatile and non-volatile memory and/or storage elements), at least one input device, and at least one output device. In addition, the components may communicate via local and/or remote processes such as in accordance with a signal having one or more data packets (e.g., data from one component interacting with another component in a local system, distributed system, and/or across a network such as the Internet with other systems via the signal).

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, the some aspects of the disclosed subject matter may be implemented as a system, method, apparatus, or article of manufacture using standard programming and/or engineering techniques to produce software, firmware, hardware, or any combination thereof to control a computer or processor based device to implement aspects detailed herein. The terms "article of manufacture", "computer program product" or similar terms, where used herein, are intended to encompass a computer program accessible from any computer-readable device, carrier, or media. For example, computer readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally, it is known that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the various embodiments.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A method, comprising:
   determining an interference level, at a transmitter, generated by a set of wireless nodes in a wireless communication environment;
   independently selecting a transmission strategy, based on the interference level, to achieve an information rate, wherein the selecting the transmission strategy includes unilaterally identifying the transmission strategy from a set of available strategies of a game theoretical model of the wireless communication environment; and
   transmitting information, via the transmitter, to a receiver in accordance with the transmission strategy.

2. The method of claim 1, further comprising determining a set of constraints imposed on transmissions of the transmitter within the wireless communication environment,
   wherein the independently selecting the transmission strategy further includes determining the transmission strategy in accordance with the set of constraints.

3. The method of claim 2, further comprising determining a null constraint of the set of constraints.

4. The method of claim 3, wherein the determining the null constraint further comprises:
   detecting locations of primary users within the wireless communication environment;
   determining, at least one of, respective directions of the primary users detected relative to the transmitter, respective frequency bands utilized by the primary users, or respective time slots utilized by the primary users; and
   generating the null constraint in accordance with the at least one of the respective directions, respective frequency bands, or respective time slots.

5. The method of claim 2, further comprising determining a soft shaping constraint of the set of constraints, wherein the soft shaping constraint specifies at least one of total average power or peak average power allowed to be radiated along steering vectors indicating directions of primary users of the wireless communication environment.

6. The method of claim 1, wherein the determining the set of constraints includes identifying a power constraint specifying a power amount available for allocation among directions in a domain space of a channel utilized when transmitting the information, wherein the domain space is at least one of a time domain space, a frequency domain space, or a spatial domain space.

7. The method of claim 1, wherein the independently selecting the transmission strategy further comprises generating a transmit covariance matrix.

8. The method of claim 7, wherein the transmitting the information further comprises transmitting in accordance with the transmit covariance matrix.

9. The method of claim 8, wherein the transmitting in accordance with the transmit covariance matrix further comprises transmitting signals along beamforming vectors and at power levels specified by the transmit covariance matrix.

10. The method of claim 7, wherein the generating the transmit covariance matrix further comprises performing a waterfilling operation over a channel that includes the interference level and encodes a set of constraints on transmissions of the transmitter.

11. The method of claim 10, further comprising utilizing a result of the waterfilling operation as the transmit covariance matrix, wherein the result satisfies the set of constraints.

12. The method of claim 1, further comprising:
    receiving an update schedule specifying a set of iterations at which the transmitter updates the transmission strategy;
    iterating through a series of iterations; and
    updating the transmission strategy when a current iteration is included in the set of iterations.

13. The method of claim 12, further comprising:
    verifying whether a convergence criterion is satisfied; and
    terminating the iterating when the convergence criterion is satisfied, wherein satisfaction of the convergence criterion indicates a system-wide equilibrium in the wireless communication environment.

14. The method of claim 12, further comprising, for a respective iteration:
    measuring interference generated by a wireless node of the set of wireless nodes;
    calculating the interference level based the interference measured and previous interference measurements made in a previous iteration;
    identifying the transmission strategy for the respective iteration.

15. The method of claim 14, wherein identifying the transmission strategy for the respective iteration further comprises:
    maintaining a previous transmission strategy as the transmission strategy when the respective iteration is not included in the set of iterations at which the transmitter updates; and
    determining a new transmission strategy for utilization as the transmission strategy when the respective iteration is included in the set of iterations at which the transmitter updates.

16. The method of claim 15, wherein the determining the new transmission strategy further comprises calculating a best-response which maximizes the information rate of the transmitter in view of the interference level.

17. A wireless communication apparatus, comprising:
    a receiver subsystem, coupled to a set of receive antennas, and configured to process a received signal, transmitted over a first wireless channel, to generate a received information signal;
    a transmitter subsystem, coupled to a set of transmit antennas, and configured to process output information and to generate a signal, from the output information, transmittable over a second wireless channel via the set of transmit antennas; and
    an adaptive transmission module configured to evaluate at least one condition within a wireless communication environment of the wireless communication apparatus, to identify a set of constraints imposed on transmission of the wireless communication apparatus, and to generate a transmission strategy applicable to the transmissions of the wireless communication apparatus, wherein the transmission strategy represents a response in a strategic, noncooperative game formulation of opportunistic transmission within the wireless communication environment.

18. The wireless communication apparatus of claim 17, wherein the transmitter subsystem is further configured to apply the transmission strategy generated by the adaptive transmission module to generate the signal from the output information.

19. The wireless communication apparatus of claim 17, wherein the adaptive transmission module further comprises:
    an environment sensing module configured to determine an interference level observed by the wireless communication apparatus and to estimate channels over which signals are received or transmitted by the wireless communication apparatus;
    a node detection module configured to detect presence of primary wireless nodes within the wireless communication environment;
    a constraint determination module configured to generate the set of constraints based on the interference level and the presence of the primary wireless nodes; and
    a matrix generation module configured to generate a transmit a covariance matrix that specifies the transmission strategy.

20. The wireless communication apparatus of claim 19, wherein the adaptive transmission module further comprises a cognitive radio engine configured to direct the environment sensing module, the node detection module, the constraint determination module, and the matrix generation module in accordance with a distributed response algorithm for the strategic, noncooperative game formulation,
    wherein the cognitive radio engine is further configured to iterate through a plurality of iterations until a convergence criterion is satisfied, wherein, in a respective iteration, the cognitive ration engine is configured to instruct the environment sensing module to update environment information and to instruct the matrix generation module to generate a transmit covariance matrix.

21. The wireless communication apparatus of claim 20, wherein satisfaction of the convergence criterion indicates that the wireless communication environment converged to a Nash equilibrium of the strategic, noncooperative game formulation.

22. The wireless communication apparatus of claim 19, wherein the constraint determination module is further configured to determine a null constraint based on the detected presence of the primary wireless nodes, wherein the null constraint specifies frequency, temporal, or spatial regions over which the wireless communication apparatus cannot transmit.

23. The wireless communication apparatus of claim 19, wherein the node detection module is further configured to determine respective locations of the primary wireless nodes in terms of, at least one of, space, frequency, or time.

24. The wireless communication apparatus of claim 19, wherein the matrix generation module is further configured to employ a waterfilling operation over a channel matrix modified in accordance with the interference level, the channel estimates, and the set of constraints.

25. A non-transitory computer-readable storage medium having stored thereon computer-executable instructions that, in response to execution, cause a communication device to perform operations, comprising:
    evaluating at least one environmental condition within a wireless communication system to identify interference generated by a plurality of secondary users sharing identical resources with at least one primary user of the wireless communication system;
    determining a set of constraints that represent physical constraints of the communication device and interference limits which can be imposed on the at least one primary user;
    determining a transmission strategy as a response to a noncooperative game formulation of resource competition among the plurality of secondary users in the wireless communication system, wherein the transmission strategy represents an independent action of the communication device without coordination with the plurality of secondary users; and
    employing the transmission strategy for data transmissions within the wireless communication system.

* * * * *